(12) United States Patent
Hall et al.

(10) Patent No.: US 9,672,020 B2
(45) Date of Patent: Jun. 6, 2017

(54) SELECTIVELY LOADING PRECOMPILED HEADER(S) AND/OR PORTION(S) THEREOF

(71) Applicant: Microsoft Technology Licensing, LLC, Redmond, WA (US)

(72) Inventors: Mark L. Hall, Redmond, WA (US); Sridhar S. Madhugiri, Sammamish, WA (US); Jonathan C. Emmett, Seattle, WA (US); Leonard C. Mosescu, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/491,642

(22) Filed: Sep. 19, 2014

(65) Prior Publication Data
US 2016/0085523 A1 Mar. 24, 2016

(51) Int. Cl.
*G06F 9/45* (2006.01)

(52) U.S. Cl.
CPC .............. *G06F 8/48* (2013.01); *G06F 8/423* (2013.01)

(58) Field of Classification Search
CPC .................................................. G06F 9/45516
USPC .................................................. 717/136–167
See application file for complete search history.

(56) References Cited

U.S. PATENT DOCUMENTS

| | | | | |
|---|---|---|---|---|
| 5,680,622 A * | 10/1997 | Even | ........................ | G06F 8/427 375/240 |
| 5,692,196 A * | 11/1997 | Unni | .......................... | G06F 8/48 707/999.003 |
| 5,822,588 A * | 10/1998 | Sterling | .............. | G06F 11/3632 714/E11.209 |
| 5,905,990 A | 5/1999 | Inglett | | |
| 6,226,786 B1 * | 5/2001 | Hickman | ............ | G06F 11/3624 714/E11.209 |
| 6,654,954 B1 * | 11/2003 | Hicks | .................. | G06F 9/45516 707/999.202 |
| 6,658,492 B1 * | 12/2003 | Kawahara | ........... | G06F 9/44573 717/159 |

(Continued)

FOREIGN PATENT DOCUMENTS

| | | |
|---|---|---|
| CN | 1981200 A | 6/2007 |
| WO | 9607137 A1 | 3/1996 |

OTHER PUBLICATIONS

Yu, Yijun, et al. "Reducing build time through precompilations for evolving large software." Software Maintenance, 2005. ICSM'05. Proceedings of the 21st IEEE International Conference on. IEEE, 2005, pp. 1-10.*

(Continued)

*Primary Examiner* — Satish Rampuria
(74) *Attorney, Agent, or Firm* — Wade IP Law LLC

(57) ABSTRACT

Techniques are described herein that are capable of selectively loading precompiled header(s) and/or portion(s) thereof. A precompiled header is a complied (e.g., precompiled) representation of a header file. For instance, the compiled representation may be in an intermediate form that a compiler may process more quickly than the non-compiled header file. In one example, the precompiled header(s) and/or portion(s) thereof may be selectively loaded based on whether the precompiled header(s) and/or portion(s) thereof are referenced in a computer program. In another example, loading a portion of a precompiled header may be deferred until content of the portion is referenced in a computer program.

20 Claims, 12 Drawing Sheets

(56) References Cited

U.S. PATENT DOCUMENTS

| | | | | |
|---|---|---|---|---|
| 7,461,236 | B1* | 12/2008 | Wentzlaff | G06F 15/17337 712/10 |
| 7,958,497 | B1* | 6/2011 | Lindo et al. | 717/128 |
| 8,214,810 | B2 | 7/2012 | Dettinger et al. | |
| 2007/0150851 | A1* | 6/2007 | Kumar | G06F 8/36 717/100 |
| 2007/0162903 | A1* | 7/2007 | Babb, II | G06F 8/75 717/154 |
| 2007/0294319 | A1* | 12/2007 | Mankad | G06F 11/1662 |
| 2010/0235847 | A1* | 9/2010 | Brehmer et al. | 719/328 |
| 2013/0104112 | A1* | 4/2013 | Novillo et al. | 717/151 |

OTHER PUBLICATIONS

Burger, Doug, and Todd M. Austin. "The SimpleScalar tool set, version 2.0." ACM SIGARCH Computer Architecture News 25.3 (1997), pp. 13-25.*

Yu, Yijun. "Faster Compilation through Lighter Precompilation." http://computing.open.ac.uk, (2012), pp. 1-8.*

Naumann, Axel, and Philippe Canal. The role of interpreters in high performance computing. No. FERMILAB-CONF-08-693-CD. 2008. pp. 1-8.*

Savitskii, V. O., and D. V. Sidorov. "Fast analysis of source code in C and C++." Programming and Computer Software 39.1 (2013): pp. 49-55.*

Bothner, Per. "Compiling Java for embedded systems." Embedded Systems Conference West, San Jose. 1997. pp. 1-16.*

Lattner, Chris. "LLVM 2.0 and Beyond!." Google Tech Talk, Mountain View, CA (2007). pp. 1-35.*

"International Search Report & Written Opinion Issued in PCT Application No. PCT/US2015/050541", Mailed Date: Nov. 19, 2015, 12 Pages.

Koehler, et al., "A Caching Compiler for C", In IEEE Pacific Rim Conference on Communications, Computers, and Signal Processing, May 17, 1995, pp. 141-144.

Litman, A., "An Implementation of Precompiled Headers", In Software: Practice and Experience, vol. 23, Issue 03, Mar. 1, 1993, pp. 341-350.

"Second Written Opinion Issued in PCT Application No. PCT/US2015/050541", Mailed Date: Jul. 12, 2016, 7 Pages.

"International Preliminary Report on Patentability Issued in PCT Application No. PCT/US2015/050541", Mailed Date: Oct. 19, 2016, 8 Pages.

Krishnaswamy, Tara, "Automatic Precompiled Headers: Speeding up C++ Application Build Times", In Proceedings of the First Workshop on Industrial Experiences with Systems Software Workshop, Oct. 22, 2000, 14 pages.

"/YX (Automatic Use of Precompiled Headers)", Published on: Jan. 19, 2011, 3 pages, Available at: http://msdn.microsoft.com/en-us/library/aa984747(v=vs.71).aspx.

Heindl, Christoph, "Reducing Compilation Time: Precompiled Header", Published on: Feb. 21, 2010, 9 pages, Available at: http://cheind.wordpress.com/2010/02/21/reducing-compilation-time-precompiled-header/.

"Precompiled Header Files in Visual Studio 2010", Published on: Jan. 26, 2010, 7 pages, Available at: http://blogs.msdn.com/b/vcblog/archive/2010/01/26/precompiled-header-files-in-visual-studio-2010.aspx.

Heindl, Christoph, "Reducing Compilation Time: Unity Builds", Published on: Dec. 10, 2009, 7 pages, Available at: http://cheind.wordpress.com/2009/12/10/reducing-compilation-time-unity-builds/.

"Creating Precompiled Header Files", Retrieved on: Jul. 22, 2014, 1 page, Available at: http://msdn.microsoft.com/en-us/library/szfdksca(v=vs.110).aspx.

"Precompiled header", Retrieved on: Jul. 22, 2014, 4 pages, Available at: http://en.wikipedia.org/wiki/Precompiled_header.

"Using Precompiled Headers", Retrieved on: Jul. 22, 2014, 2 pages, Available at: http://gcc.gnu.org/onlinedocs/gcc/Precompiled-Headers.html.

* cited by examiner

SELECTIVELY LOADING PRECOMPILED HEADER(S) AND/OR PORTION(S) THEREOF

BACKGROUND

A computer program build system typically includes a compiler that compiles translation units (e.g., source files that have been preprocessed) of a computer program to provide object files and a linker that links the object files in a specified order to provide an executable representation of the computer program. In convention build systems, compilers often have a relatively limited view of the computer program. For instance, compilers traditionally process one translation unit of the computer program at a time, which may limit a speed with which the compiler compiles the computer program.

Precompiled headers may be employed in an effort to increase the speed with which the computer program is compiled. However, in conventional build systems that utilize precompiled headers, source code is compiled up to a point, and the resulting compiled code is persisted in memory as a single block of code. The entire block of code is subsequently extracted as a single block from the memory. Moreover, conventional build systems often impose relatively strict limitations on how precompiled headers may be used.

SUMMARY

Various approaches are described herein for, among other things, selectively loading precompiled header(s) and/or portion(s) thereof. A precompiled header is a complied (e.g., precompiled) representation of a header file. For instance, the compiled representation may be in an intermediate form that a compiler may process more quickly than the non-compiled header file. A header file is defined herein to be source code that is included in a compiled program. It will be recognized that although the term "header file" is used throughout this disclosure, a header file as described herein need not necessarily be a "header file" as is commonly known in the context of the C++ programming language. Moreover, a header file need not necessarily be a file. In a first example approach, a header file is compiled to provide a precompiled header in data structure(s). The precompiled header is extracted from the data structure(s). A reference that is associated with the precompiled header is loaded during compilation of a computer program. Loading a portion of the precompiled header is deferred until content of the portion is referenced in the computer program.

In a second example approach, header files are compiled to provide precompiled headers. Each precompiled header is included in respective data structure(s) that represent source code of header file(s) from which the precompiled header is compiled. Each precompiled header is extracted from the respective data structure(s). Each precompiled header is distinguished from others of the precompiled headers. Each precompiled header is selectively loaded independently from others of the precompiled headers based on whether the respective precompiled header is referenced in a computer program.

In a third example approach, a header file is compiled to provide a precompiled header in data structure(s). The precompiled header is extracted from the data structure(s). Each portion of the precompiled header is distinguished from other portions of the precompiled header based on references that correspond to the respective portions of the precompiled header. Each portion of the precompiled header is selectively loaded independently from the other portions of the precompiled header based on whether the respective portion is referenced in a computer program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
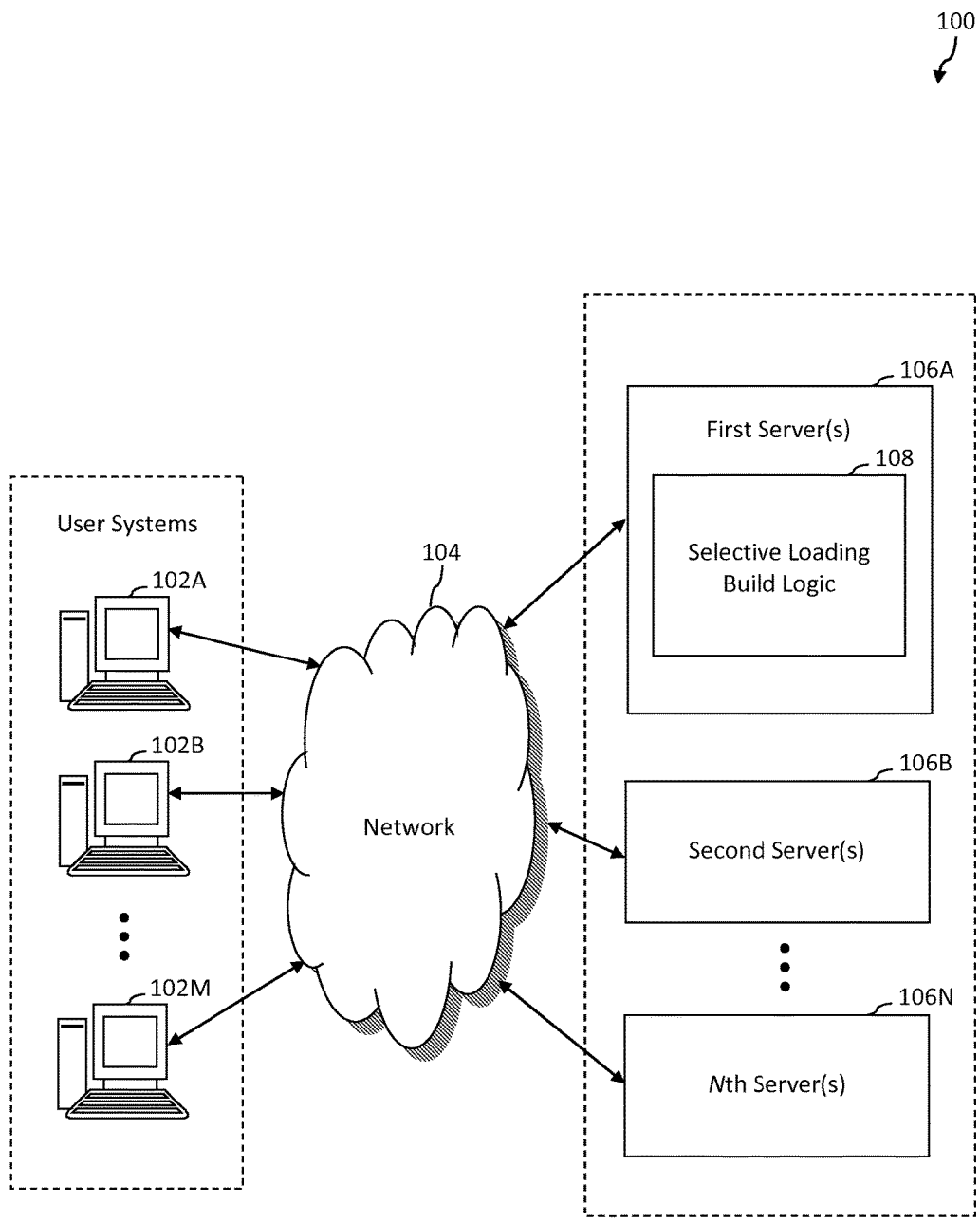
FIG. 1 is a block diagram of an example selective loading system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of selectively loading precompiled header(s) and/or portion(s) thereof. A precompiled header is a complied (e.g., precompiled) representation of a header file. For instance, the compiled representation may be in an intermediate form that a compiler may process more quickly than the non-compiled header file. The precompiled header may be a non-text version of the header file that is optimized and precompiled, though the scope of the example embodiments is not limited in this respect. In one example, the precompiled header(s) and/or portion(s) thereof may be selectively loaded based on whether the precompiled header(s) and/or portion(s) thereof are referenced in a computer program. In another example, loading a portion of a precompiled header may be deferred until the portion is referenced in a computer program.

Example techniques described herein have a variety of benefits as compared to conventional techniques for building a computer program. For instance, the example techniques may be capable of reducing (e.g., eliminating) at least some of the limitations on the use of precompiled headers that are prevalent in conventional building systems. For example, the techniques described herein may enable precompiled headers and/or portions thereof to be loaded separately from other precompiled headers and/or other portions. In accordance with this example, the precompiled headers and/or portions may be stored in respective data structures that represent source code of the header files from which the precompiled headers are compiled. The example techniques may be capable of distinguishing between versions of a precompiled header and determining whether a version is appropriate for loading.

The example techniques may be capable of reducing complexity of a build system in which they are employed. The example techniques may be implemented without changing code (e.g., source code) in the computer program, without annotations, and/or without changing the build system. The example techniques may be implemented in manner that is transparent to a user of the computer program. For instance, a compiler with which the precompiled headers are compiled may interact transparently with a shared precompiled header cache that is associated with the build system. For instance, the compiler may query the shared precompiled header cache to determine whether a suitable precompiled header is available upon encountering an include directive. If a suitable precompiled header is available, the compiler may use the precompiled header in lieu of parsing (e.g., re-parsing) the corresponding header file. Precompiled headers that are not suitable may become candidates for caching for later reuse. The example techniques may be more scalable than conventional techniques.

Example methods are described. In accordance with a first example method, a header file is compiled to provide a precompiled header in data structure(s). The precompiled header is extracted from the data structure(s). A reference that is associated with the precompiled header is loaded during compilation of the computer program. Loading a portion of the precompiled header is deferred until content of the portion is referenced in the computer program.

In accordance with a second example method, header files are compiled to provide precompiled headers. Each precompiled header is included in respective data structure(s) that represent source code of header file(s) from which the precompiled header is compiled. Each precompiled header is extracted from the respective data structure(s). Each precompiled header is distinguished from others of the precompiled headers. Each precompiled header is selectively loaded independently from others of the precompiled headers based on whether the respective precompiled header is referenced in a computer program.

In accordance with a third example method, a header file is compiled to provide a precompiled header in data structure(s). The precompiled header is extracted from the data structure(s). Each portion of the precompiled header is distinguished from other portions of the precompiled header based on references that correspond to the respective portions of the precompiled header. Each portion of the precompiled header is selectively loaded independently from the other portions of the precompiled header based on whether the respective portion is referenced in a computer program.

Example systems are also described. A first example system includes a compiler, an extractor, and a loader. The compiler is configured to compile a header file to provide a precompiled header in data structure(s). The extractor is configured to extract the precompiled header from the data structure(s). The loader is configured to load a reference that is associated with the precompiled header during compilation of the computer program. The loader is further configured to defer loading of a portion of the precompiled header until content of the portion is referenced in the computer program.

A second example system includes a compiler, an extractor, and a loader. The compiler is configured to compile header files to provide precompiled headers. Each precompiled header is included in respective data structure(s) that represent source code of header file(s) from which the precompiled header is compiled. The extractor is configured to extract each precompiled header from the respective data structure(s). The extractor is further configured to distinguish each precompiled header from others of the precompiled headers. The loader is configured to selectively load each precompiled header independently from others of the precompiled headers based on whether the respective precompiled header is referenced in a computer program.

A third example system includes a compiler, an extractor, and a loader. The compiler is configured to compile a header file to provide a precompiled header in data structure(s). The extractor is configured to extract the precompiled header from the data structure(s). The extractor is further configured to distinguish each portion of the precompiled header from other portions of the precompiled header based on references that correspond to the respective portions of the precompiled header. The loader is configured to selectively load each portion of the precompiled header independently from the other portions of the precompiled header based on whether the respective portion is referenced in a computer program.

Example computer program products are also described. A first example computer program product includes a computer-readable medium having computer program logic recorded thereon for enabling a processor-based system to selectively load at least a portion of a precompiled header.

The computer program product includes a first program logic module, a second program logic module, and a third program logic module. The first program logic module is for enabling the processor-based system to compile a header file to provide the precompiled header in data structure(s). The second program logic module is for enabling the processor-based system to extract the precompiled header from the data structure(s). The third program logic module is for enabling the processor-based system to load a reference that is associated with the precompiled header during compilation of the computer program. The third program logic module is also for enabling the processor-based system to defer loading of a portion of the precompiled header until content of the portion is referenced in the computer program.

A second example computer program product includes a computer-readable medium having computer program logic recorded thereon for enabling a processor-based system to selectively load precompiled headers. The computer program product includes a first program logic module, a second program logic module, a third program logic module, and a fourth program logic module. The first program logic module is for enabling the processor-based system to compile header files to provide the precompiled headers. Each precompiled header is included in respective data structure(s) that represent source code of header file(s) from which the precompiled header is compiled. The second program logic module is for enabling the processor-based system to extract each precompiled header from the respective data structure(s). The third program logic module is for enabling the processor-based system to distinguish each precompiled header from others of the precompiled headers. The fourth program logic module is for enabling the processor-based system to selectively load each precompiled header independently from others of the precompiled headers based on whether the respective precompiled header is referenced in a computer program.

A third example computer program product includes a computer-readable medium having computer program logic recorded thereon for enabling a processor-based system to selectively load portions of a precompiled header. The computer program product includes a first program logic module, a second program logic module, a third program logic module, and a fourth program logic module. The first program logic module is for enabling the processor-based system to compile a header file to provide the precompiled header in data structure(s). The second program logic module is for enabling the processor-based system to extract the precompiled header from the data structure(s). The third program logic module is for enabling the processor-based system to distinguish each portion of the precompiled header from other portions of the precompiled header based on references that correspond to the respective portions of the precompiled header. The fourth program logic module is for enabling the processor-based system to selectively load each portion of the precompiled header independently from the other portions of the precompiled header based on whether the respective portion is referenced in a computer program.

FIG. 1 is a block diagram of an example selective loading system 100 in accordance with an embodiment. Generally speaking, selective loading system 100 operates to provide information to users (e.g., software engineers, application developers, etc.) in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, selective loading system 100 selectively loads precompiled header(s) and/or portion(s) thereof. Detail regarding techniques for selectively loading precompiled header(s) and/or portion(s) thereof is provided in the following discussion.

As shown in FIG. 1, selective loading system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a desktop computer, a laptop computer, a tablet computer, a personal digital assistant, a cellular telephone, or the like.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of selective loading system 100.

One example type of computer program that may be executed by one or more of servers 106A-106N is a developer tool. A developer tool is a computer program that performs diagnostic operations (e.g., identifying source of problem, debugging, profiling, controlling, etc.) with respect to program code. Examples of a developer tool include but are not limited to a web development platform (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.). It will be recognized that the example techniques described herein may be implemented using a developer tool.

First server(s) 106A is shown to include selective loading build logic 108 for illustrative purposes. Selective loading build logic 108 is configured to selectively load precompiled header(s) and/or portion(s) thereof. Selective loading build logic 108 may include any of a variety of functionalities for building a computer program, including but not limited to source control, static code analysis, compilation, linking, extraction, loading, etc.

Source control involves managing changes to a computer program. For instance, each time a change is made to the computer program, a revision number associated with the computer program may be incremented; a timestamp indicating a time at which the change was made may be stored; an indicator that specifies a person who made the change may be recorded, etc.

Static code analysis involves analyzing the computer program for comments, unit tests, duplication, complexity, potential bugs, adherence to coding rules, etc. without executing the computer program.

Compilation involves transforming source code of the computer program into code of another language (e.g., executable code or intermediate code). For instance, the computer program may be compiled from a relatively higher-level programming language (e.g., C or C++) to a relatively lower-level language (e.g., assembly language or machine code). The source code may be compiled into object files, which are relocatable format machine code. The compiled computer program may be persisted to disk for subsequent processing.

Linking involves combining the code that results from compilation (e.g., object files) into a single executable computer program.

Extraction involves receiving (e.g., retrieving) information (e.g., data, computer program code, etc.) from a store for processing. For instance, precompiled headers may be extracted from a store during compilation of a computer program.

Loading involves storing information (e.g., executable code of a computer program) in main memory of one or more processing systems (e.g., any one or more of user systems 102A-102M and/or servers 106A-106N). For instance, such information may be copied from disk to the main memory. Loading may further involve performing preparatory operations to prepare executable code of the computer program for running Examples of a preparatory operation include but are not limited to validating permissions, memory requirements, etc. associated with the computer program; copying command-line arguments on the stack; initializing registers, such as the stack pointer; jumping to the entry point of the computer program, etc. In accordance with example embodiments described herein, loading may involve selectively loading precompiled header(s) and/or portion(s) thereof to the main memory of the processing system(s).

It will be recognized that selective loading build logic 108 may be (or may be included in) a developer tool, though the scope of the example embodiments is not limited in this respect. Example techniques for selectively loading precompiled header(s) and/or portion(s) thereof are discussed in greater detail below with reference to FIGS. 2-11.

Selective loading build logic 108 may be implemented in various ways to selectively load precompiled header(s) and/or portion(s) thereof, including being implemented in hardware, software, firmware, or any combination thereof. For example, selective loading build logic 108 may be implemented as computer program code configured to be executed in one or more processors. In another example, selective loading build logic 108 may be implemented as hardware logic/electrical circuitry. For instance, selective loading build logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Selective loading build logic 108 is shown to be incorporated in first server(s) 106A for illustrative purposes and is not intended to be limiting. It will be recognized that selective loading build logic 108 (or any portion(s) thereof) may be incorporated in any one or more of the user systems 102A-102M. For example, client-side aspects of selective loading build logic 108 may be incorporated in one or more of the user systems 102A-102M, and server-side aspects of selective loading build logic 108 may be incorporated in first server(s) 106A. In another example, selective loading build logic 108 may be distributed among the user systems 102A-102M. In yet another example, selective loading build logic 108 may be incorporated in a single one of the user systems 102A-102M. In another example, selective loading build logic 108 may be distributed among the server(s) 106A-106N. In still another example, selective loading build logic 108 may be incorporated in a single one of the server(s) 106A-106N.

Figure 2:
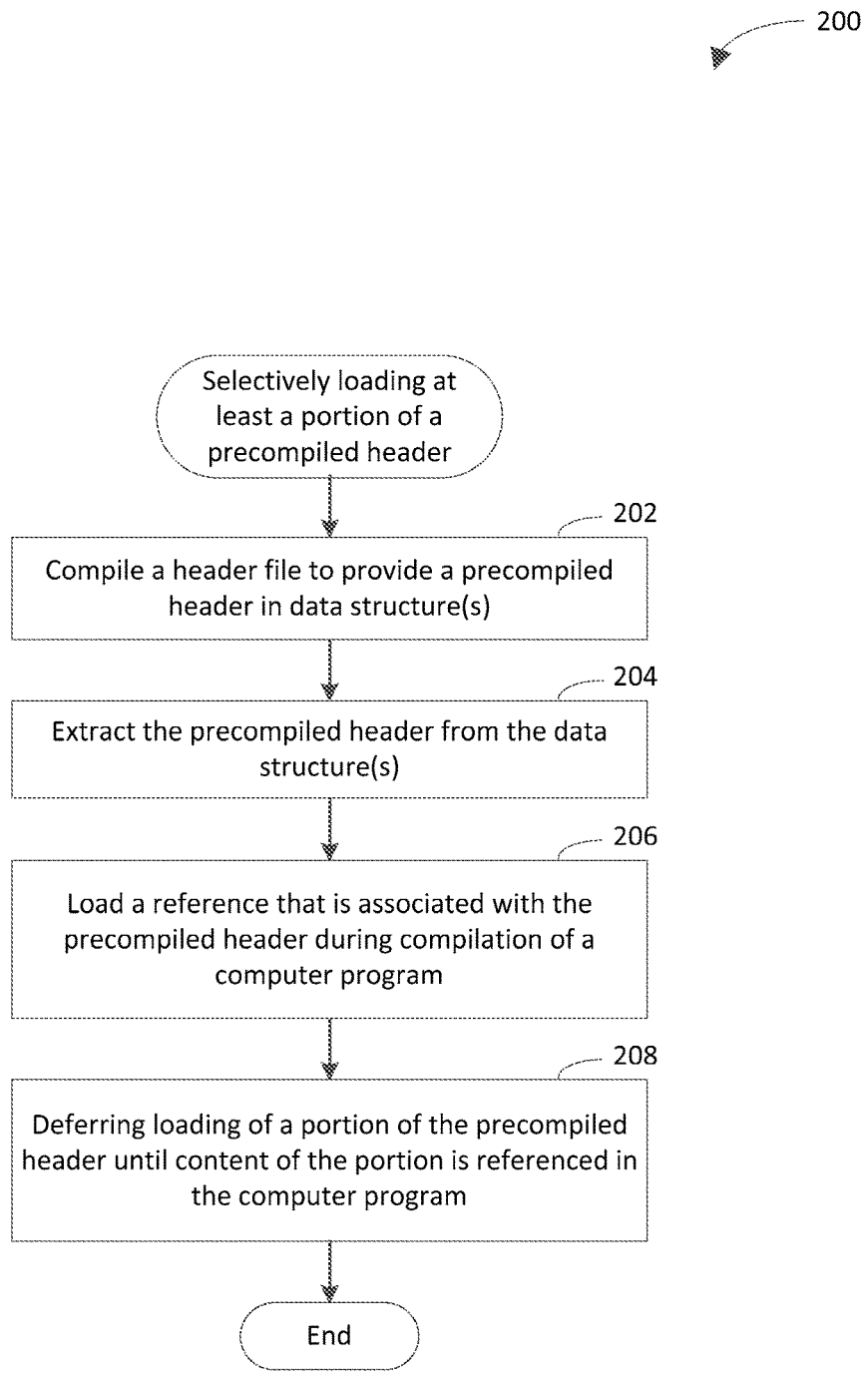
FIGS. 2-4 depict flowcharts of example methods for selectively loading at least a portion of a precompiled header in accordance with embodiments.
Figure 3:
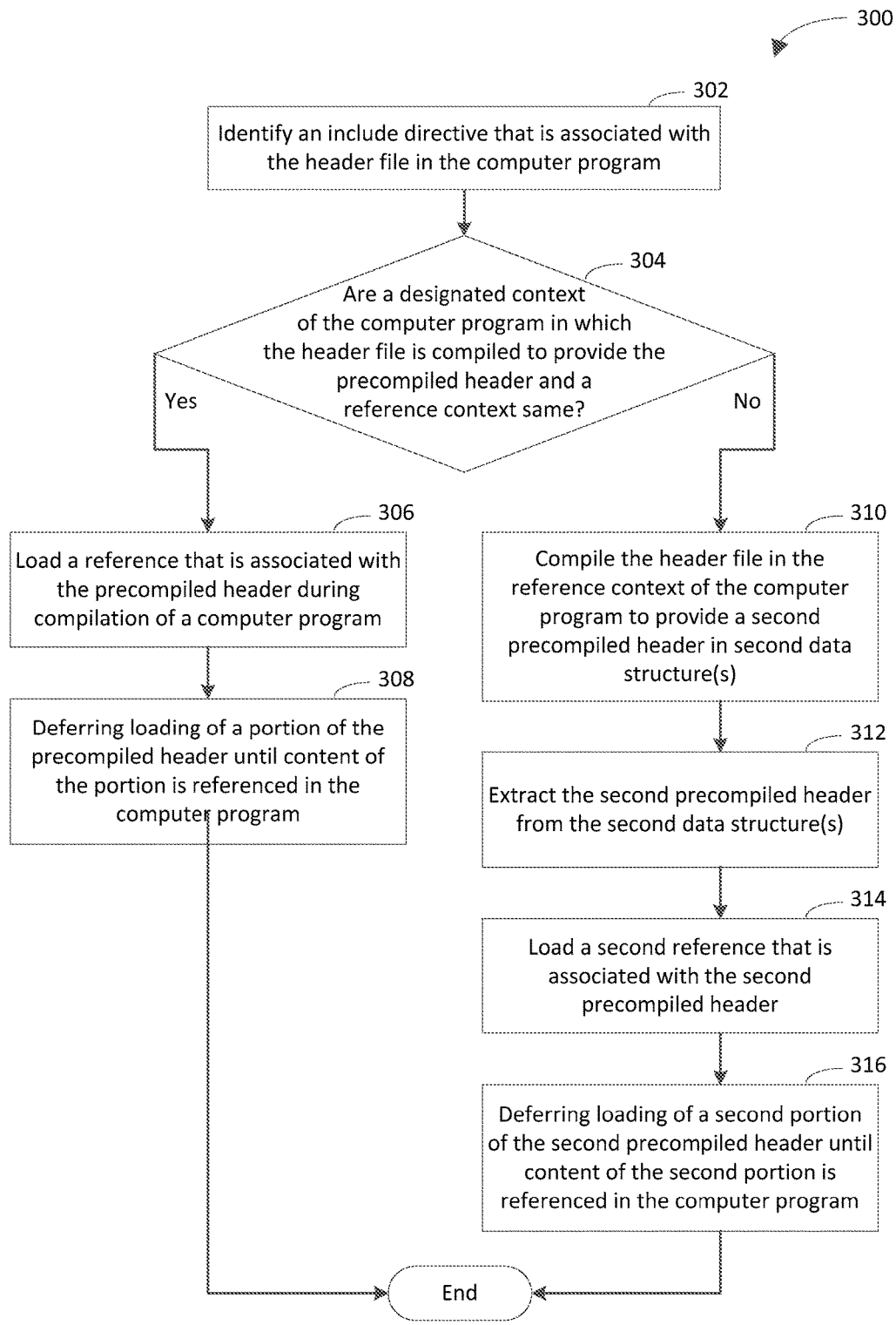
Figure 4:
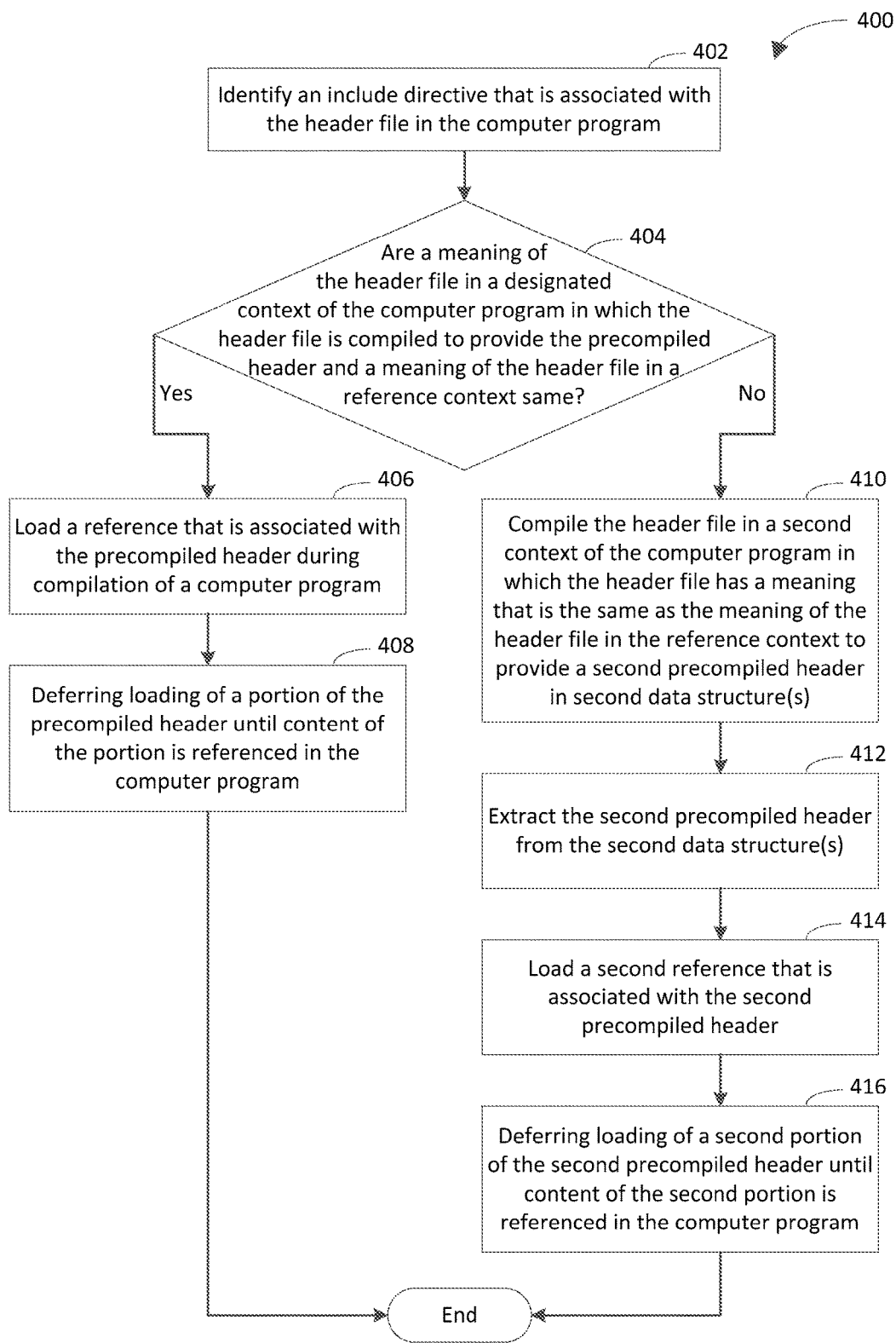
Figure 5:
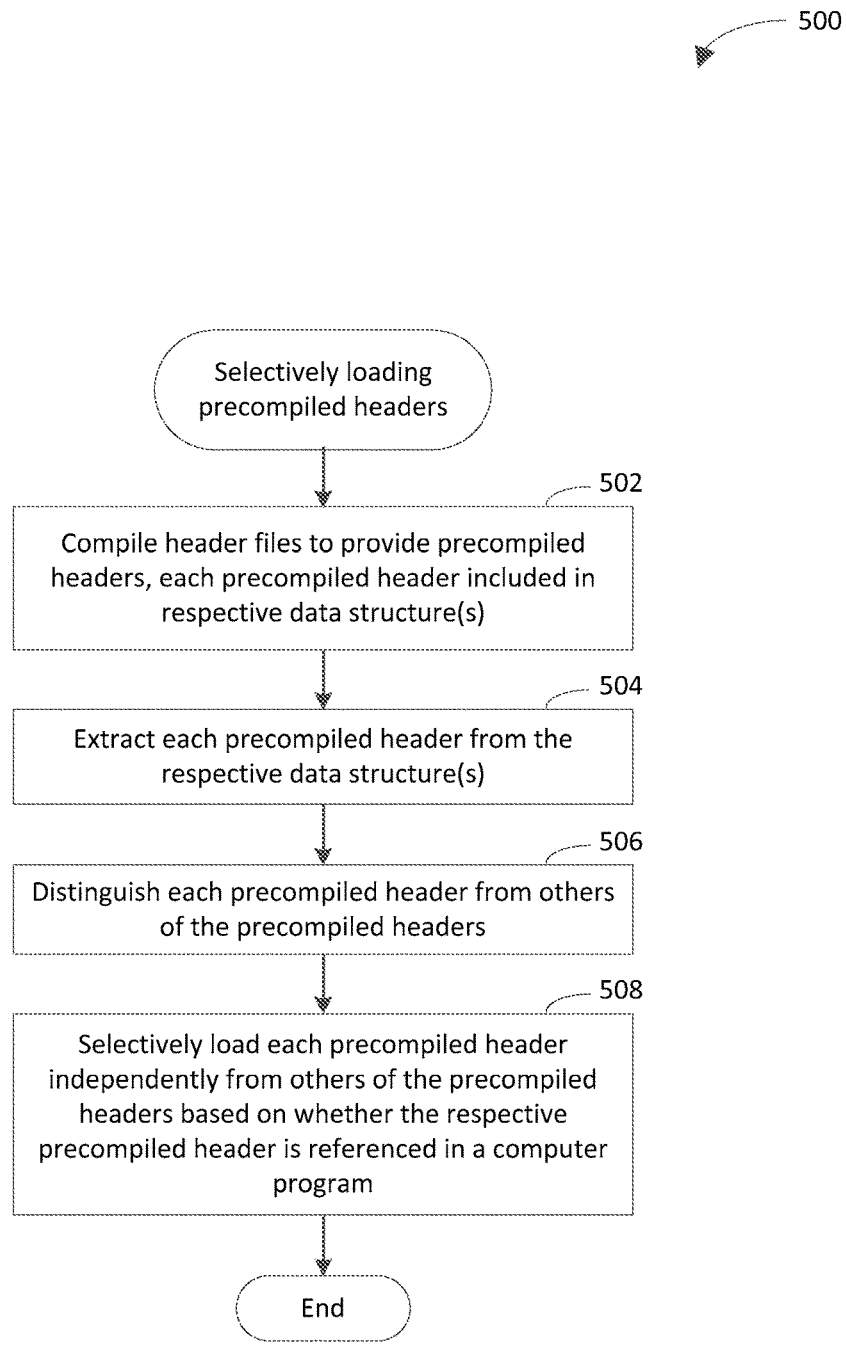
FIGS. 5-7 depict flowcharts of example methods for selectively loading precompiled headers in accordance with embodiments.
Figure 6:
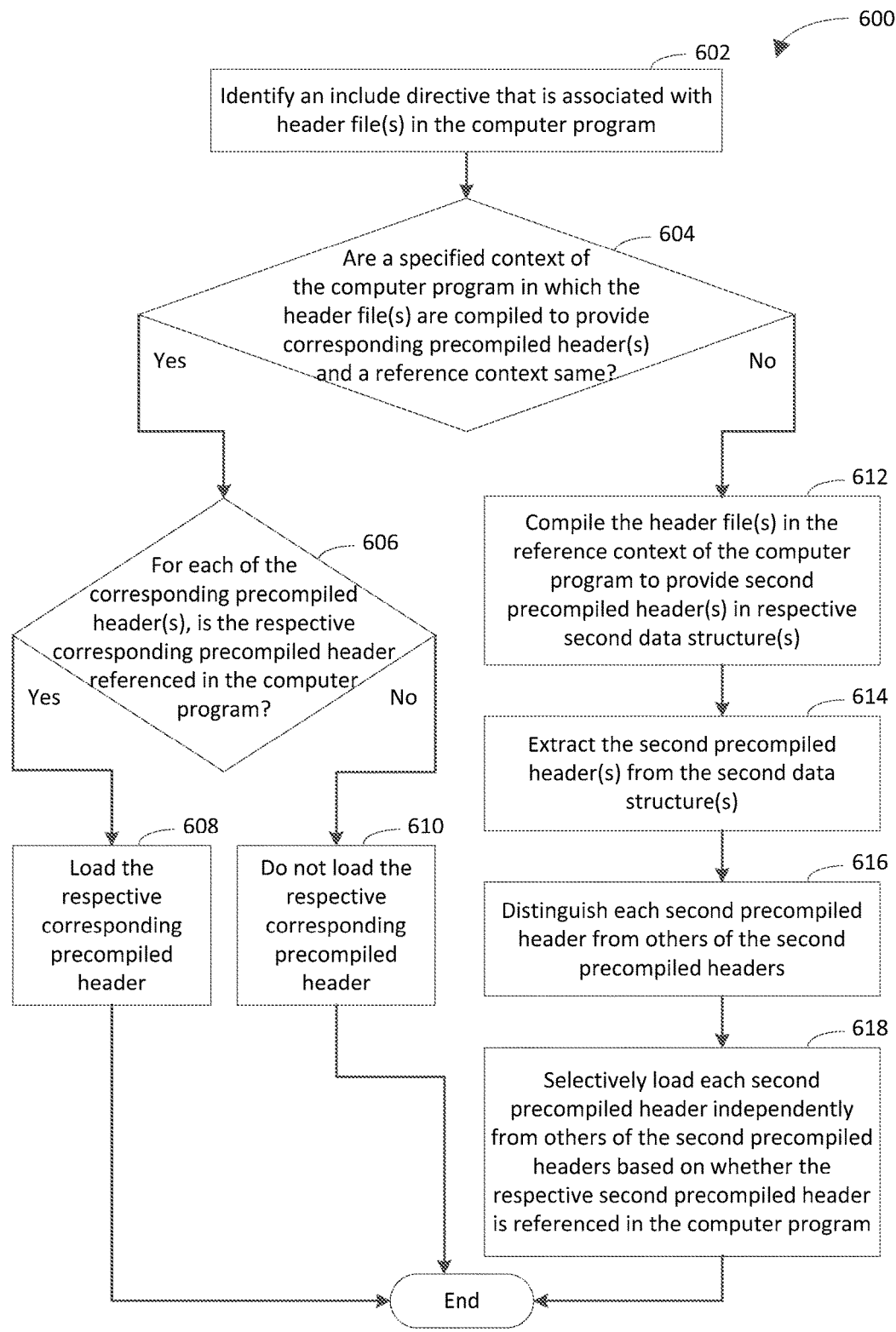
Figure 7:
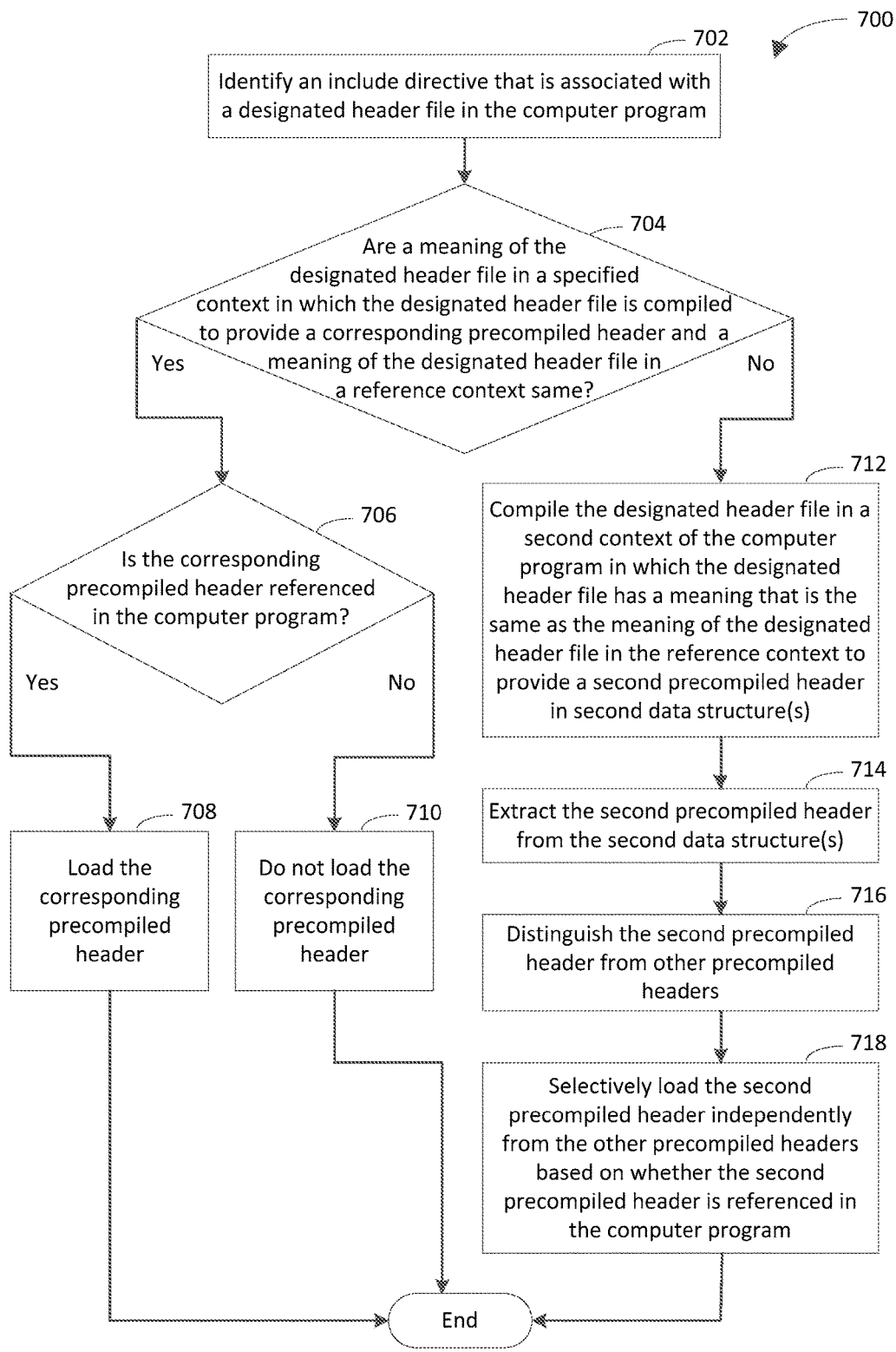
Figure 8:
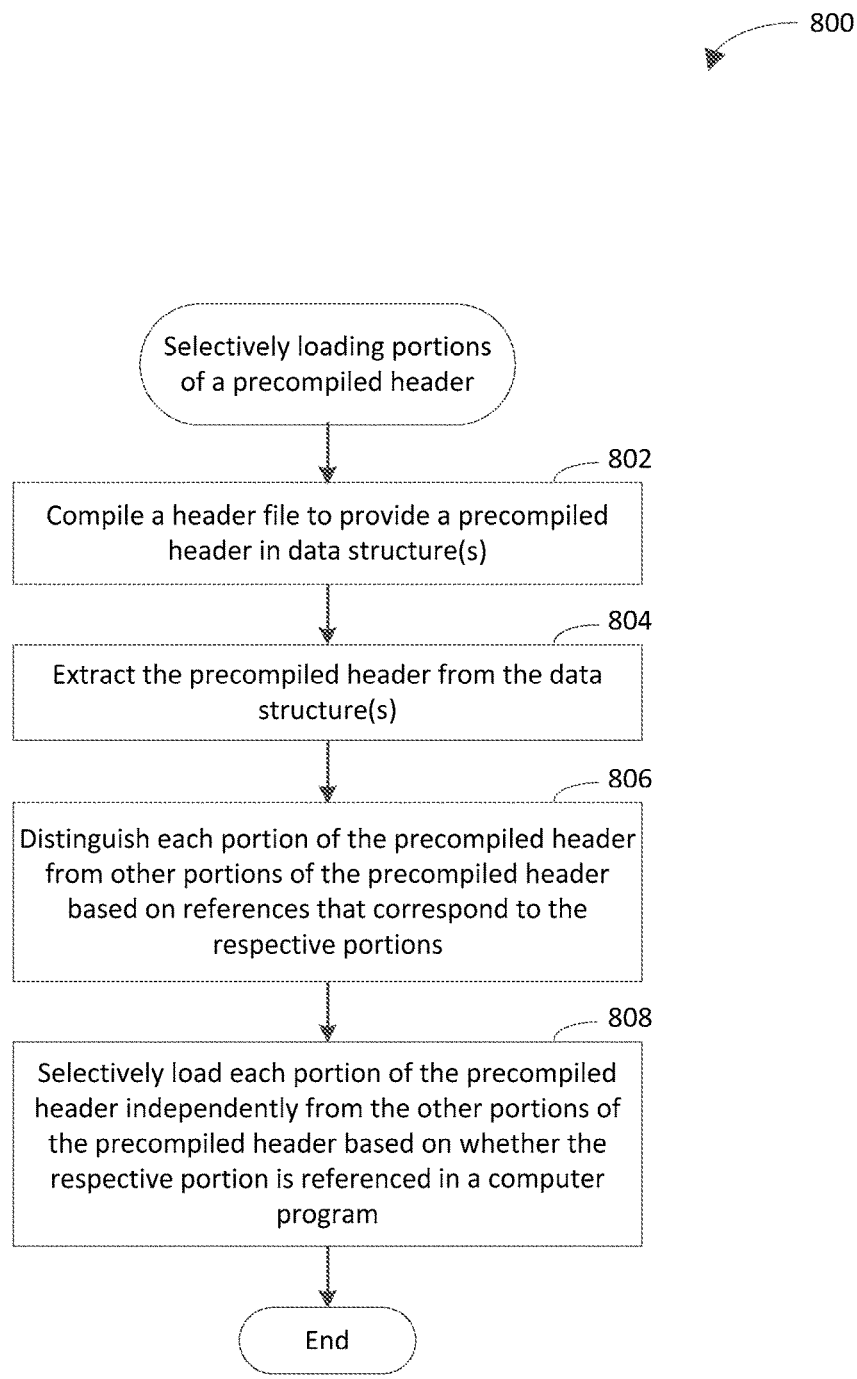
FIGS. 8-10 depict flowcharts of example methods for selectively loading portions of a precompiled header in accordance with embodiments.
Figure 9:
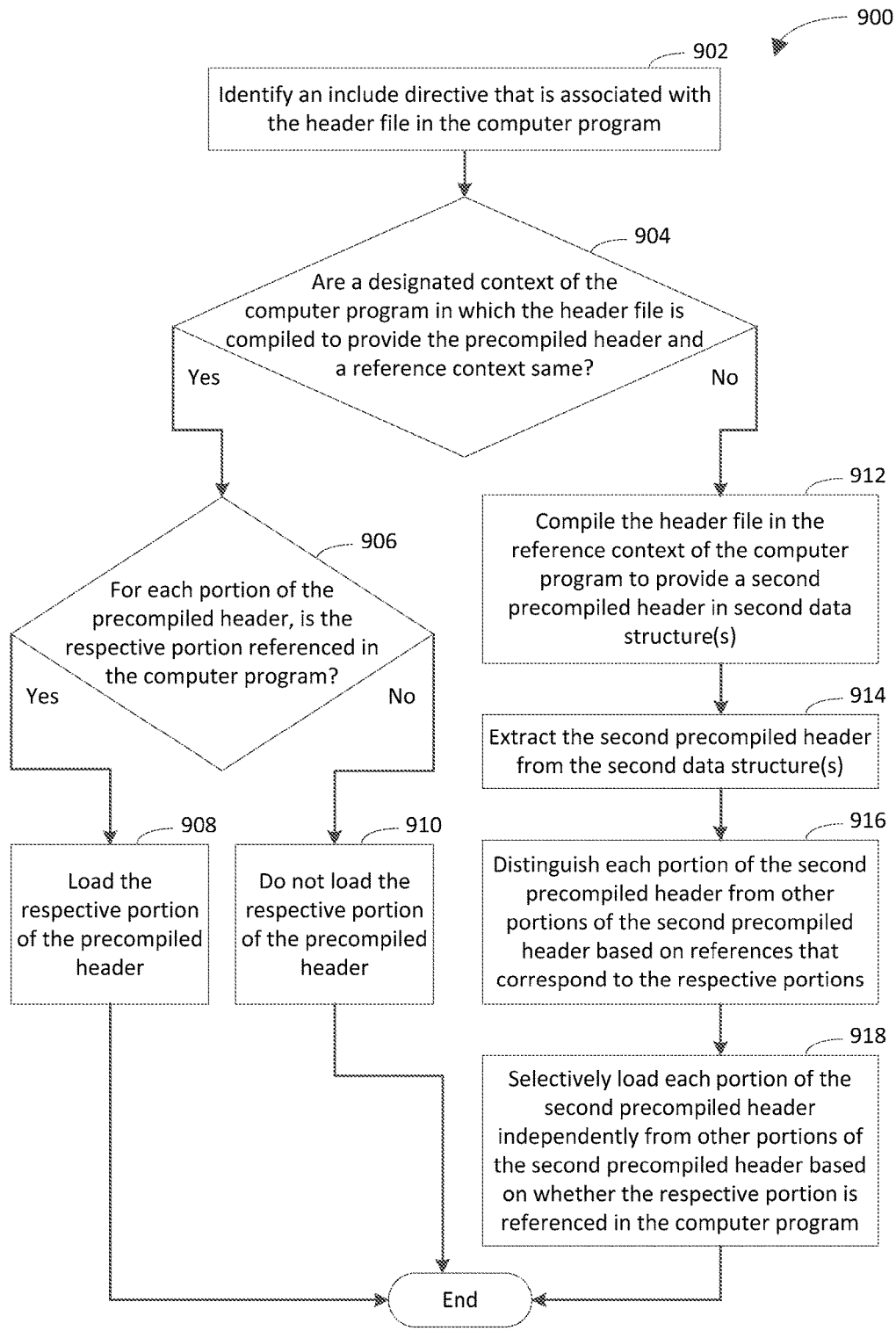
Figure 10:
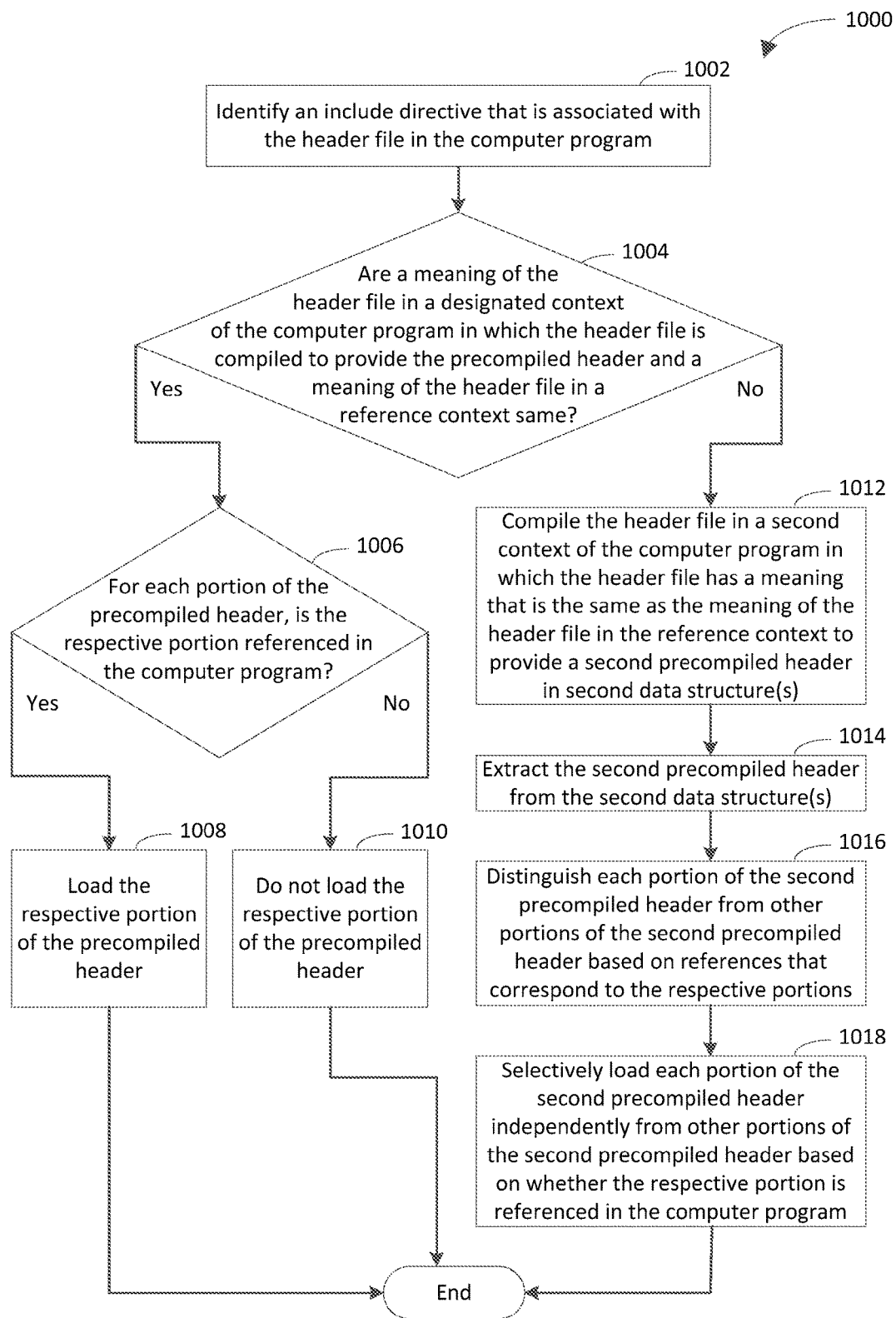
Figure 11:
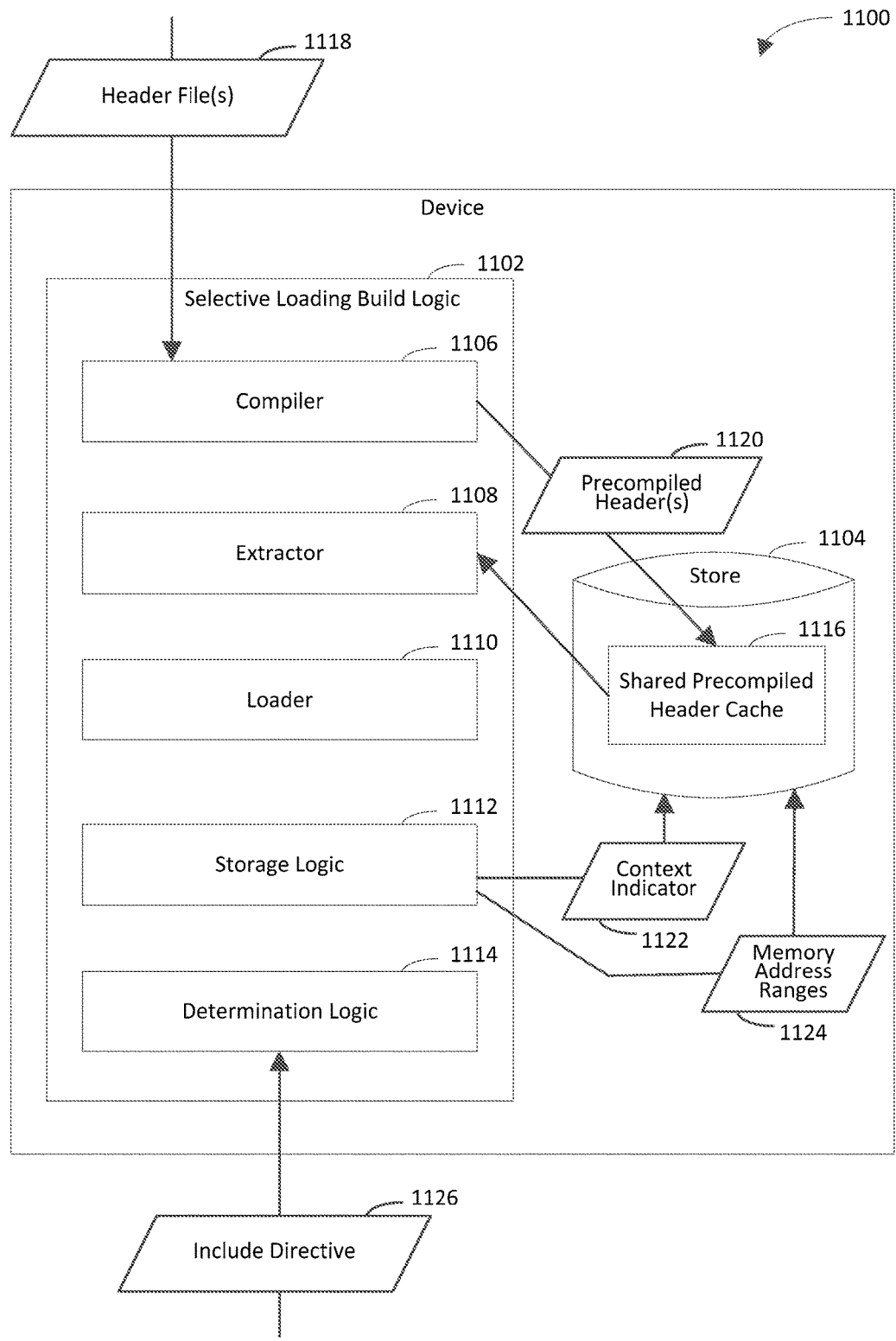
FIG. 11 is a block diagram of a device that includes an example implementation of selective loading build logic shown in FIG. 1 in accordance with an embodiment.

FIGS. 2-4 depict flowcharts of example methods for selectively loading at least a portion of a precompiled header in accordance with embodiments. FIGS. 5-7 depict flowcharts of example methods for selectively loading precompiled headers in accordance with embodiments. FIGS. 8-10 depict flowcharts of example methods for selectively loading portions of a precompiled header in accordance with embodiments. Flowcharts 200, 300, 400, 500, 600, 700, 800, 900, and 1000 may be performed by selective loading build logic 108 shown in FIG. 1, for example. For illustrative purposes, flowcharts 200, 300, 400, 500, 600, 700, 800, 900, and 1000 are described with respect to a device 1100 shown in FIG. 11. Device 1100 may include one or more of user systems 102A-102M, one or more of server(s) 106A-106N, or any combination thereof, though the scope of the example embodiments is not limited in this respect. Device 1100 includes selective loading build logic 1102, which is an example of selective loading build logic 108, according to an embodiment. As shown in FIG. 11, device 1100 further includes a store 1104. Store is shown to include a shared precompiled header cache 1116 for illustrative purposes. Selective loading build logic 1102 is shown to include a compiler 1106, an extractor 1108, a loader 1110, storage logic 1112, and determination logic 1114. Further structural and operational embodiments will be apparent to persons skilled in the relevant art(s) based on the discussion regarding flowcharts 200, 300, 400, 500, 600, 700, 800, 900, and 1000.

As shown in FIG. 2, the method of flowchart 200 begins at step 202. In step 202, a header file is compiled to provide a precompiled header in data structure(s). For example, the header file may be an individual header file. An individual header file does not include any other header files. In another example, the precompiled header may be an individual precompiled header. An individual precompiled header does not include any other precompiled headers. The precompiled header may be a binary header, though the scope of the example embodiments is not limited in this respect. Each of the data structure(s) may include any suitable structure, including but not limited to a type, a symbol, a tree, a token (e.g., in C++), etc.

In an example implementation, compiler 1102 compiles the header file to provide the precompiled header. For instance, the header file may be included in header file(s) 1118, and the precompiled header may be included in precompiled header(s) 1120. Compiler 1106 may provide the precompiled header to data structure(s) stored in shared precompiled header cache 1116, though the scope of the example embodiments is not limited in this respect. Shared precompiled header cache 1116 is a centralized storage location where any one or more (e.g., all) of the precompiled headers that are available to be incorporated into the computer program (e.g., data structure(s) in which the precompiled headers are stored) may be stored. For example, centralizing the storage location by using shared precompiled header cache 1116 may increase a speed (e.g., reduce a processing time) with which the computer program is built. In accordance with this example, using shared precompiled header cache 1116 may increase a speed with which the computer program is compiled and/or a speed with which the precompiled headers are loaded. The precompiled header may be a snapshot of a running state of compiler 1106. It will be recognized that each of the data structure(s) may be any structure that is used internally by compiler 1106 to capture a compiled state of the computer program.

In an example context embodiment, the header file is compiled in a designated context of a computer program to provide the precompiled header in the data structure(s). In accordance with this embodiment, the designated context includes a designated location of the header file with respect to other portions of the computer program and/or a designated order of the header file with respect to the other portions of the computer program. For instance, the designated location may indicate that the header file is the tenth header file in the computer program, and the designated order may indicate that the header file follows header files A, B, and C and precedes header file D in the computer program. The example designated location and order are provided for illustrative purposes and are not intended to be limiting. It will be recognized that the header file may have any suitable designated location and/or designated order.

At step 204, the precompiled header is extracted from the data structure(s). In an example implementation, extractor 1108 extracts the precompiled header from the data structure(s), which may be stored in shared precompiled header cache 1116. In one aspect of this implementation, extractor 1108 pauses compilation of the computer program temporarily to extract the precompiled header. In accordance with this aspect, extractor 1108 causes the compilation of the computer program to resume in response to completion of the extraction of the precompiled header.

In the example context embodiment mentioned above with respect to step 202, the precompiled header is extracted from the data structure(s) based on the designated context. A further discussion of the designated context, including an explanation of some example ways the designated context may be used for selectively loading at least a portion of the precompiled header, is provided below with reference to FIGS. 3 and 4.

At step 206, a reference that is associated with the precompiled header is loaded (e.g., automatically loaded) during compilation of a computer program. For instance, the reference may uniquely identify the header file and/or the precompiled header. The reference may include a name of the header file and/or a name of the precompiled header. The reference may be of any suitable form, including but not limited to a function, a class, a variable, etc. The computer program may be written in any suitable language, including but not limited to C, C++, Python™, Java™, Ruby, etc. In an example implementation, loader 1110 loads the reference.

In an example multi-reference embodiment, step 206 includes loading multiple references that are associated with the precompiled header. The multiple references correspond to multiple respective portions of the precompiled header. For instance, each of the portions may be incrementally loaded based on whether the reference that corresponds to that portion is referenced in the computer program. Each portion may be included in a respective data structure, though the scope of the example embodiments is not limited in this respect.

At step 208, loading a portion of the precompiled header is deferred (e.g., automatically deferred) until content of the portion is referenced in the computer program. For instance, deferring the loading of the portion of the precompiled header at step 208 may be performed in response to loading the reference at step 206. Deferring the loading of the portion of the precompiled header at step 208 may be performed automatically without requiring any changes to the computer program. In an example implementation, loader 1110 defers the loading of the portion of the precompiled header until content of the portion is referenced in the computer program.

In the example multi-reference embodiment mentioned above with reference to step 206, step 208 includes deferring the loading of each of the multiple portions until content of the respective portion is referenced in the computer program.

In some example embodiments, one or more steps 202, 204, 206, and/or 208 of flowchart 200 may not be performed. Moreover, steps in addition to or in lieu of steps 202, 204, 206, and/or 208 may be performed. For instance, in the example context embodiment mentioned above with respect to steps 202 and 204, the method of flowchart 200 may include storing a context indicator that specifies the designated location and the designated order based on the header file being compiled in the designated context. For instance, storage logic 1112 may store context indicator 1122, which specifies the designated location and the designated order. In accordance with this embodiment, the method of flowchart 200 may further include reviewing the context indicator to determine the designated location and the designated order. For instance, extractor 1108 may review the context indicator 1122 to determine the designated location and the designated order. In further accordance with this embodiment, the precompiled header may be extracted at step 204 in response to reviewing the context indicator. For instance, extractor 1108 may extract the precompiled header in response to reviewing the context indicator 1122.

In another example embodiment, the method of flowchart 200 includes allocating memory address ranges to respective header files of the computer program. For instance, storage logic 1112 may allocate memory address ranges 1124 to the respective header files (e.g., header file(s) 1118). In accordance with this embodiment, step 202 includes compiling the header files to provide respective precompiled headers. Each of the precompiled headers is provided in one or more data structures in a respective memory address range. For instance, the one or more data structures in which a precompiled header is provided may represent source code of header file(s) from which the precompiled header is compiled. Each precompiled header is unmodifiable by others of the precompiled headers. Accordingly, each precompiled header is unable to overwrite another precompiled header. Each precompiled header is unable to change pointers of another precompiled header. For instance, each precompiled header may be configured as a read-only precompiled header. Any one or more precompiled headers may be layered on any one or more other precompiled headers, so long as none of the precompiled headers modifies the data structure(s) of another precompiled header.

In yet another example embodiment, the method of flowchart 200 includes identifying symbol(s) that are defined in the header file. The symbol(s) include pointer(s). In accordance with this embodiment, the method of flowchart 200 further includes determining one or more dependencies of the symbol(s) based on the pointer(s) pointing to the one or more dependencies. In further accordance with this embodiment, step 204 includes extracting the symbol(s) and the one or more dependencies. It will be recognized that the data structure(s) in which the precompiled header is provided may include the symbol(s). The data structure(s) may also include at least one (e.g., all) of the one or more dependencies.

In another example embodiment, steps 206 and 208 of flowchart 200 may be replaced with one or more of the steps shown in flowchart 300 of FIG. 3. As shown in FIG. 3, the method of flowchart 300 begins at step 302. In step 302, an include directive that is associated with the header file is identified in the computer program. In an example implementation, compiler 1106 and/or determination logic 1114 identify include directive 1126, which is associated with the header file, in the computer program. For instance, compiler 1106 may identify the include directive 1126 by encountering the include directive while compiling the computer program. Determination logic 1114 may review the computer program as compiler 1106 compiles the computer program or prior to compiler 1106 compiling the computer program. Determination logic 1114 may identify the include directive 1126 while reviewing the computer program.

At step 304, a determination is made whether a designated context of the computer program in which the header file is compiled to provide the precompiled header and a reference context are same. For instance, determining whether the designated context and the reference context are the same at step 304 may be performed in response to identifying the include directive at step 302. In one example, the designated context may include a designated location of the header file with respect to other portions of the computer program and/or a designated order of the header file with respect to the other portions of the computer program. In accordance with this example, the reference context may include a reference location of the header file with respect to other portions of the computer program and/or a reference order of the header file with respect to the other portions of the computer program. In further accordance with this example, if the designated location and the designated order are the same as the reference location and the reference order, respectively, the designated context and the reference context are the same; otherwise, the designated context and the reference context are not the same. If the designated context and the reference context are the same, flow continues to step 306. Otherwise flow continues to step 310. In an example implementation, determination logic 1114 determines whether the designated context and the reference context are the same.

At step 306, a reference that is associated with the precompiled header is loaded during compilation of a computer program. In an example implementation, loader 1110 loads the reference.

At step 308, loading a portion of the precompiled header is deferred until content of the portion is referenced in the computer program. Upon completion of step 308, the method of flowchart 300 ends. In an example implementation, loader 1110 defers the loading of the portion of the precompiled header until content of the portion is referenced in the computer program.

At step 310, the header file is compiled in the reference context of the computer program to provide a second precompiled header in second data structure(s). In an example implementation, compiler 1106 compiles the header file in the reference context to provide the second precompiled header in the second data structure(s).

At step 312, the second precompiled header is extracted from the second data structure(s). In an example implementation, extractor 1108 extracts the second precompiled header from the second data structure(s).

At step 314, a second reference that is associated with the second precompiled header is loaded. In an example implementation, loader 1110 loads the second reference that is associated with the second precompiled header.

At step 316, loading a second portion of the second precompiled header is deferred until content of the second portion is referenced in the computer program. Upon completion of step 316, the method of flowchart 300 ends. In an example implementation, loader 1110 defers the loading of the second portion of the second precompiled header until content of the second portion is referenced in the computer program.

In yet another example embodiment, steps 206 and 208 of flowchart 200 may be replaced with one or more of the steps shown in flowchart 400 of FIG. 4. As shown in FIG. 4, the method of flowchart 400 begins at step 402. In step 402 an include directive that is associated with the header file is identified in the computer program. In an example implementation, determination logic 1114 identifies include directive 1126, which is associated with the header file, in the computer program.

At step 404, a determination is made whether a meaning of the header file in a designated context of the computer program in which the header file is compiled to provide the precompiled header and a meaning of the header file in a reference context are same. For instance, determining whether the meaning of the header file in the designated context and meaning of the header file in the reference context are the same at step 404 may be performed in response to identifying the include directive at step 402. If the meaning of the header file in the designated context and the meaning of the header file in the reference context are the same, flow continues to step 406. Otherwise flow continues to step 410. In an example implementation, determination logic 1114 determines whether the meaning of the header file in the designated context and the meaning of the header file in the reference context are the same.

A meaning of the header file is a result of executing a compiled representation of the header file (e.g., a result of executing the precompiled header, which is provided by compiling the header file). For example, compiling the header file in the designated context may provide a first result, and compiling the header file in the reference context may provide a second result that is different from the first result. In accordance with this example, if the first result is the same as the second result, the meaning of the header file in the designated context and the meaning of the header file in the reference context are the same. In further accordance with this example, if the first result differs from the second result, the meaning of the header file in the designated context and the meaning of the header file in the reference context are different. It should be noted that the include directives in the header file in the designated context and the include directives in the header file in the reference context need not necessarily be the same and need not necessarily be in the same order in order for the meaning of the header file in the designated context and the meaning of the header file in the reference context to be the same.

The meaning of the header file in the designated context and the meaning of the header file in the reference context are said to be "exactly the same" if the include directives in the header file in the designated context and the include directives in the header file in the reference context are the same and are in the same order. In accordance with this embodiment, the meaning of the header file in the designated context and the meaning of the header file in the reference context are not "exactly the same" if the include directives in the header file in the designated context and the include directives in the header file in the reference context are not the same and/or are not in the same order.

At step 406, a reference that is associated with the precompiled header is loaded during compilation of a computer program. In an example implementation, loader 1110 loads the reference that is associated with the precompiled header.

In an example embodiment, multiple references are associated with respective versions of the precompiled header. The versions of the precompiled header are associated with respective contexts. In accordance with this embodiment, step 406 includes selecting the reference from the multiple references based on the reference being associated with a designated version of the precompiled header that is associated with the designated context.

At step 408, loading a portion of the precompiled header is deferred until content of the portion is referenced in the computer program. Upon completion of step 408, the method of flowchart 400 ends. In an example implementation, load 1110 defers the loading of the portion of the precompiled header until content of the portion is referenced in the computer program.

At step 410, the header file is compiled in a second context of the computer program in which the header file has a meaning that is the same as the meaning of the header file in the reference context to provide a second precompiled header in second data structure(s). In an example implementation, compiler 1106 compiles the header file in the second context of the computer program to provide the second precompiled header in the second data structure(s).

At step 412, the second precompiled header is extracted from the second data structure(s). In an example implementation, extractor 1108 extracts the second precompiled header from the second data structure(s).

At step 414, a second reference that is associated with the second precompiled header is loaded. In an example implementation, loader 1110 loads the second reference.

At step 416, loading a second portion of the second precompiled header is deferred until content of the second portion is referenced in the computer program. Upon completion of step 416, the method of flowchart 400 ends. In an example implementation, loader 1110 defers the loading of the second portion of the second precompiled header until content of the second portion is referenced in the computer program.

As mentioned above, FIGS. 5-7 depict flowcharts of example methods for selectively loading precompiled headers in accordance with embodiments. As shown in FIG. 5, the method of flowchart 500 begins at step 502. In step 502, header files are compiled to provide precompiled headers. Each precompiled header is included in respective data structure(s) that represent source code of header file(s) from which the precompiled header is compiled. For instance, including each precompiled header is respective data structure(s) may enable the precompiled header to be loaded independently from others of the precompiled headers. Each precompiled header may be an individual precompiled header. Accordingly, each precompiled header may not include any other precompiled headers. In an example implementation, compiler 1106 compiles header file(s) 1118 to provide precompiled header(s) 1120.

In an example context embodiment, each header file is compiled in a respective context of a computer program to provide the respective precompiled headers. In accordance with this embodiment, each context of the computer program includes a location of the respective header file in the computer program and/or an order of the respective header file with regard to the other portions of the computer program.

At step 504, each precompiled header is extracted from the respective data structure(s). In an example implementation, extractor 1108 extracts each of the precompiled header(s) 1120 from the respective data structure(s).

In the example context embodiment mentioned above with respect to step 502, each precompiled header is extracted from the respective data structure(s) based on the context in which the respective header file is compiled. A further discussion of contexts, including an explanation of some example ways such contexts may be used for selectively loading precompiled headers, is provided below with reference to FIGS. 6 and 7.

At step 506, each precompiled header is distinguished (e.g., automatically distinguished) from others of the precompiled headers. In an example implementation, storage logic 1108 and/or determination logic 1110 distinguish each of the precompiled header(s) 1120 from others of the precompiled header(s) 1120. For instance, storage logic 1108 and/or determination logic 1110 may assign identifier(s) to the respective precompiled header(s) 1120. Each identifier may be different from others of the identifier(s). Storage logic 1108 may store the precompiled header(s) 1120 in respective location(s) in memory of device 1100 (e.g., in respective locations in store 1104 and/or shared precompiled header cache 1116). Storage logic 1108 may store the identifier(s) with the precompiled header(s) 1120 in store 1104 and/or shared precompiled header cache 1116. Storage logic 1108 and/or determination logic 1110 may maintain a lookup table that cross-references the identifier(s) and address(es) of the respective memory location(s).

At step 508, each precompiled header is selectively loaded (e.g., automatically selectively loaded) independently from others of the precompiled headers based on whether the respective precompiled header is referenced in a computer program. Selectively loading each precompiled header at step 508 may be performed automatically without requiring any changes to the computer program. The computer program may be written in any suitable language, including but not limited to C, C++, Python™, Java™, Ruby, etc. In an example implementation, loader 1110 selectively loads each of the precompiled header(s) 1120 independently from others of the precompiled header(s)

1120 based on whether the respective precompiled header is referenced in the computer program.

In an example embodiment, each precompiled header is included in a respective subset of a plurality of data structures. Each subset includes the respective data structure(s) in which the respective precompiled header is included. In accordance with this embodiment, distinguishing each precompiled header at step 506 includes organizing each subset of the plurality of subsets in memory to not overlap with others of the plurality of subsets in the memory. For instance, the plurality of subsets may be organized in a plurality of respective ranges of memory addresses in the memory to not overlap with others of the plurality of ranges. In an example implementation, storage logic 1108 organizes each subset of the plurality of subsets in the memory.

In some example embodiments, one or more steps 502, 504, 506, and/or 508 of flowchart 500 may not be performed. Moreover, steps in addition to or in lieu of steps 502, 504, 506, and/or 508 may be performed. For instance, in an example embodiment, the method of flowchart 500 includes distinguishing each portion of a plurality of portions of at least one precompiled header of the plurality of precompiled headers from others of the plurality of portions. For example, storage logic 1108 and/or determination logic 1110 may distinguish each portion of the at least one precompiled header from others of the plurality of portions. In accordance with this embodiment, the method of flowchart 500 further includes selectively loading each portion of the plurality of portions independently from others of the plurality of portions based on whether the respective portion is referenced in the computer program. For example loader 1110 selectively loads each portion of the at least one precompiled header independently from others of the plurality of portions based on whether the respective portion is referenced in the computer program.

In another example embodiment, the method of flowchart 500 includes determining that at least one header file includes pointer(s). For instance, determination logic 1114 may determine that at least one header file includes pointer(s). In accordance with this embodiment, the method of flowchart 500 further includes determining at least one dependency of the at least one header file based on the pointer(s) pointing to the at least one dependency. For instance, determination logic 1114 may determine at least one dependency of the at least one header file based on the pointer(s) pointing to the at least one dependency.

In yet another example embodiment, step 508 of flowchart 500 may be replaced with one or more of the steps shown in flowchart 600 of FIG. 6. As shown in FIG. 6, the method of flowchart 600 begins at step 602. In step 602, an include directive that is associated with header file(s) is identified in the computer program. The header file(s) with which the include directive is associated may include all or fewer than all of the header files that are compiled at step 502. In an example implementation, determination logic 1114 identifies include directive 1126, which is associated with the header file(s) 1118, in the computer program.

At step 604, a determination is made whether a specified context of the computer program in which the header file(s) are compiled to provide corresponding precompiled header(s) and a reference context are same. For instance, determining whether the specified context and the reference context are the same at step 604 may be performed in response to identifying the include directive at step 602. If the specified context and the reference context are the same, flow continues to step 606. Otherwise, flow continues to step 612. In an example implementation, determination logic 1114 determines whether the specified context and the reference context are the same.

At step 606, a determination is made whether, for each of the corresponding precompiled header(s), the respective corresponding precompiled header is referenced in the computer program. If the respective corresponding precompiled header is referenced in the computer program, flow continues to step 608. Otherwise, flow continues to step 610. In an example implementation, determination logic determines, for each of the corresponding precompiled header(s), whether the respective corresponding precompiled header is referenced in the computer program.

At step 608, the respective corresponding precompiled header is loaded. In an example implementation, loader 1110 loads the respective corresponding precompiled header.

At step 610, the respective corresponding precompiled header is not loaded. In an example implementation, loader 1110 does not load the respective corresponding precompiled header.

Upon completion of either step 608 or step 610 for each of the corresponding precompiled header(s), the method of flowchart 600 ends.

At step 612, the header file(s) are compiled in the reference context of the computer program to provide second precompiled header(s) in respective second data structure(s). In an example implementation, compiler 1106 compiles the header file(s) in the reference context of the computer program to provide the second precompiled header(s) in the respective second data structure(s).

At step 614, the second precompiled header(s) are extracted from the second data structure(s). In an example implementation, extractor 1108 extracts the second precompiled header(s) from the second data structure(s).

At step 616, each second precompiled header is distinguished from others of the second precompiled headers. In an example implementation, storage logic 1108 and/or determination logic 1110 distinguish each second precompiled header from others of the second precompiled headers. For instance, storage logic 1108 and/or determination logic 1110 may assign identifier(s) to the respective second precompiled header(s). Each identifier may be different from others of the identifier(s). Storage logic 1108 may store the second precompiled header(s) in respective location(s) in memory of device 1100 (e.g., in respective locations in store 1104 and/or shared precompiled header cache 1116). Storage logic 1108 may store the identifier(s) with the second precompiled header(s) in store 1104 and/or shared precompiled header cache 1116. Storage logic 1108 and/or determination logic 1110 may maintain a lookup table that cross-references the identifier(s) and address(es) of the respective memory location(s).

At step 618, each second precompiled header is selectively loaded independently from others of the second precompiled headers based on whether the respective second precompiled header is referenced in the computer program. Upon completion of step 618, the method of flowchart 600 ends. In an example implementation, loader 1110 selectively loads each second precompiled header independently from others of the second precompiled headers based on whether the respective second precompiled header is referenced in the computer program.

In still another example embodiment, step 508 of flowchart 500 may be replaced with one or more of the steps shown in flowchart 700 of FIG. 7. As shown in FIG. 7, the method of flowchart 700 begins at step 702. In step 702, an include directive that is associated with a designated header file is identified in the computer program. In an example implementation, determination logic 1114 identifies include directive 1126, which is associated with the designated header file, in the computer program.

At step 704, a determination is made whether a meaning of the designated header file in a specified context in which the designated header file is compiled to provide a corresponding precompiled header and a meaning of the designated header file in a reference context are same. For instance, determining whether the meaning of the designated header file in the specified context and meaning of the designated header file in the reference context are the same at step 704 may be performed in response to identifying the include directive at step 702. The reference context is different from the specified context. If the meaning of the designated header file in the specified context and the meaning of the designated header file in the reference context are the same, flow continues to step 706. Otherwise, flow continues to step 712. In an example implementation, determination logic 1114 determines whether the meaning of the designated header file in the specified context and the meaning of the designated header file in the referenced context are the same.

At step 706, a determination is made whether the corresponding precompiled header is referenced in the computer program. If the corresponding precompiled header is referenced in the computer program, flow continues to step 708. Otherwise, flow continues to step 710. In an example implementation, determination logic 1114 determines whether the corresponding precompiled header file is referenced in the computer program.

At step 708, the corresponding precompiled header is loaded. In an example implementation, loader 1110 loads the corresponding precompiled header.

In an example embodiment, multiple versions of the corresponding precompiled header are associated with respective contexts. In accordance with this embodiment, step 708 includes loading a designated version of the corresponding precompiled header based on the designated version being associated with the specified context.

At step 710, the corresponding precompiled header is not loaded. In an example implementation, loader 1110 does not load the corresponding precompiled header.

Upon completion of either step 708 or step 710, the method of flowchart 700 ends.

At step 712, the designated header file is compiled in a second context of the computer program in which the designated header file has a meaning that is the same as the meaning of the designated header file in the reference context to provide a second precompiled header in second data structure(s). In an example implementation, compiler 1106 compiles the designated header file in the second context of the computer program to provide the second precompiled header in the second data structure(s).

At step 714, the second precompiled header is extracted from the second data structure(s). In an example implementation, extractor 1108 extracts the second precompiled header from the second data structure(s).

At step 716, the second precompiled header is distinguished from other precompiled headers. In an example implementation, storage logic 1108 and/or determination logic 1110 distinguish the second precompiled header from the other precompiled headers. For instance, storage logic 1108 and/or determination logic 1110 may assign identifiers to respective precompiled headers, including the second precompiled header. Each identifier may be different from others of the identifiers. Storage logic 1108 may store the precompiled headers in respective locations in memory of device 1100 (e.g., in respective locations in store 1104 and/or shared precompiled header cache 1116). Storage logic 1108 may store the identifiers with the precompiled headers in store 1104 and/or shared precompiled header cache 1116. Storage logic 1108 and/or determination logic 1110 may maintain a lookup table that cross-references the identifiers and addresses of the respective memory locations.

At step 718, the second precompiled header is selectively loaded independently from the other precompiled headers based on whether the second precompiled header is referenced in the computer program. Upon completion of step 718, the method of flowchart 700 ends. In an example implementation, loader 1110 selectively loads the second precompiled header independently from the other precompiled headers based on whether the second precompiled header is referenced in the computer program.

As mentioned above, FIGS. 8-10 depict flowcharts of example methods for selectively loading portions of a precompiled header in accordance with embodiments. As shown in FIG. 8, the method of flowchart 800 begins at step 802. In step 802, a header file is compiled to provide a precompiled header in data structure(s). The precompiled header may be an individual precompiled header. Accordingly, the precompiled header may not include any other precompiled headers. In an example implementation, compiler 1106 compiles the header file to provide the precompiled header in the data structure(s).

In an example context embodiment, the header file is compiled in a designated context of a computer program to provide the precompiled header in the data structure(s). In accordance with this embodiment, the designated context includes a location of the header file in the computer program and/or an order of the header file with regard to other parts of the computer program.

At step 804, the precompiled header is extracted from the data structure(s). In an example implementation, extractor 1108 extracts the precompiled header from the data structure(s).

In the example context embodiment mentioned above with respect to step 802, the precompiled header is extracted from the data structure(s) based on the designated context. A further discussion of the designated context, including an explanation of some example ways the designated context may be used for selectively loading portions of a precompiled header, is provided below with reference to FIGS. 9 and 10.

At step 806, each portion of the precompiled header is distinguished (e.g., automatically distinguished) from other portions of the precompiled header based on references that correspond to the respective portions. In an example implementation, storage logic 1108 and/or determination logic 1110 distinguish each portion of the precompiled header from the other portions of the precompiled header based on the references that correspond to the respective portions. For instance, storage logic 1108 and/or determination logic 1110 may assign the references to the respective portions. Each reference may be different from others of the references. Storage logic 1108 may store the portions in respective locations in memory of device 1100 (e.g., in respective locations in store 1104 and/or shared precompiled header cache 1116). Storage logic 1108 may store the references with the portions in store 1104 and/or shared precompiled header cache 1116. Storage logic 1108 and/or determination logic 1110 may maintain a lookup table that cross-references the references and addresses of the respective memory locations.

At step 808, each portion of the precompiled header is selectively loaded (e.g., automatically selectively loaded) independently from the other portions of the precompiled header based on whether the respective portion is referenced in a computer program. In one example, selectively loading each portion of the precompiled header at step 808 may be performed automatically without requiring any changes to the computer program. In another example, selectively loading each portion of the precompiled header at step 808 may be performed based on whether at least one (e.g., each) respective portion is individually referenced in the computer program. For instance, such reference may not reference any of the other portions of the precompiled header. The computer program may be written in any suitable language, including but not limited to C, C++, Python™, Java™, Ruby, etc. In an example implementation, loader 1110 selectively loads each portion of the precompiled header independently from the other portions of the precompiled header based on whether the respective portion is referenced in the computer program.

In some example embodiments, one or more steps 802, 804, 806, and/or 808 of flowchart 800 may not be performed. Moreover, steps in addition to or in lieu of steps 802, 804, 806, and/or 808 may be performed. For instance, in an example embodiment, step 808 of flowchart 800 may be replaced with one or more of the steps shown in flowchart 900 of FIG. 9. As shown in FIG. 9, the method of flowchart 900 begins at step 902. In step 902, an include directive that is associated with the header file is identified in the computer program. In an example implementation, determination logic 1114 identifies include directive 1126, which is associated with the header file, in the computer program.

At step 904, a determination is made whether a designated context of the computer program in which the header file is compiled to provide the precompiled header and a reference context are same. For instance, determining whether the designated context and the reference context are the same at step 904 may be performed in response to identifying the include directive at step 902. If the designated context and the reference context are the same, flow continues to step 906. Otherwise, flow continues to step 912. In an example implementation, determination logic 1114 determines whether the designated context and the reference context are the same.

At step 906, a determination is made whether, for each portion of the precompiled header, the respective portion is referenced in the computer program. If the respective portion is referenced in the computer program, flow continues to step 908. Otherwise, flow continues to step 910. In an example implementation, determination logic 1114 determines whether, for each portion of the recompiled header, the respective portion is referenced in the computer program.

At step 908, the respective portion of the precompiled header is loaded. In an example implementation, loader 1110 loads the respective portion of the precompiled header.

At step 910, the respective portion of the precompiled header is not loaded. In an example implementation, loader 1110 does not load the respective portion of the precompiled header.

Upon completion of either step 908 or step 910 for each portion of the precompiled header, the method of flowchart 900 ends.

At step 912, the header file is compiled in the reference context of the computer program to provide a second precompiled header in second data structure(s). In an example implementation, compiler 1106 compiles the header file in the reference context of the computer program to provide the second precompiled header in the second data structure(s).

At step 914, the second precompiled header is extracted from the second data structure(s). In an example implementation, extractor 1108 extracts the second precompiled header from the second data structure(s).

At step 916, each portion of the second precompiled header is distinguished from other portions of the second precompiled header based on references that correspond to the respective portions. In an example implementation, storage logic 1108 and/or determination logic 1110 distinguish each portion of the second precompiled header from the other portions of the second precompiled header based on the references that correspond to the respective portions. For instance, storage logic 1108 and/or determination logic 1110 may assign the references to the respective portions of the second precompiled header. Each reference may be different from others of the references. Storage logic 1108 may store the portions in respective locations in memory of device 1100 (e.g., in respective locations in store 1104 and/or shared precompiled header cache 1116). Storage logic 1108 may store the references with the portions in store 1104 and/or shared precompiled header cache 1116. Storage logic 1108 and/or determination logic 1110 may maintain a lookup table that cross-references the references and addresses of the respective memory locations.

At step 918, each portion of the second precompiled header is selectively loaded independently from other portions of the second precompiled header based on whether the respective portion is referenced in the computer program. Upon completion of step 918, the method of flowchart 900 ends. In an example implementation, loader 1110 selectively loads each portion of the second precompiled header independently from the other portions of the second precompiled header based on whether the respective portion is referenced in the computer program.

In another example embodiment, step 808 of flowchart 800 may be replaced with one or more of the steps shown in flowchart 1000 of FIG. 10. As shown in FIG. 10, the method of flowchart 1000 begins at step 1002. In step 1002, an include directive that is associated with the header file is identified in the computer program. In an example implementation, determination logic 1114 identifies include directive 1126, which is associated with the header file, in the computer program.

At step 1004, a determination is made whether a meaning of the header file in a designated context of the computer program in which the header file is compiled to provide the precompiled header and a meaning of the header file in a reference context same. For instance, determining whether the meaning of the header file in the designated context and meaning of the header file in the reference context are the same at step 1004 may be performed in response to identifying the include directive at step 1002. The reference context is different from the designated context. If the meaning of the header file in the designated context and the meaning of the header file in the reference context are the same, flow continues to step 1008. Otherwise, flow continues to step 1012. In an example implementation, determination logic 1114 determines whether the meaning of the header file in the designated context and the meaning of the header file in the reference context are the same.

At step 1006, a determination is made whether, for each portion of the precompiled header, the respective portion is referenced in the computer program. If the respective portion is referenced in the computer program, flow continues to step 1008. Otherwise, flow continues to step 1010. In an example implementation, determination logic 1114 determines, for each portion of the precompiled header, whether the respective portion is referenced in the computer program.

At step 1008, the respective portion of the precompiled header is loaded. In an example implementation, loader 1110 loads the respective portion of the precompiled header.

In an example embodiment, multiple versions of the precompiled header are associated with respective contexts. In accordance with this embodiment, the respective portion of a designated version of the precompiled header is loaded at step 1008 based on the designated version being associated with the designated context.

At step 1010, the respective portion of the precompiled header is not loaded. In an example implementation, loader 1110 does not load the respective portion of the precompiled header.

Upon completion of either step 1008 or step 1010 for each portion of the precompiled header, the method of flowchart 1000 ends.

At step 1012, the header file is compiled in a second context of the computer program in which the header file has a meaning that is the same as the meaning of the header file in the reference context to provide a second precompiled header in second data structure(s). In an example implementation, compiler 1106 compiles the header file in the second context of the computer program to provide the second precompiled header in the second data structure(s).

At step 1014, the second precompiled header is extracted from the second data structure(s). In an example implementation, extractor 1108 extracts the second precompiled header from the second data structure(s).

At step 1016, each portion of the second precompiled header is distinguished from other portions of the second precompiled header based on references that correspond to the respective portions. In an example implementation, storage logic 1108 and/or determination logic 1110 distinguish each portion of the second precompiled header from the other portions of the second precompiled header based on the references that correspond to the respective portions. For instance, storage logic 1108 and/or determination logic 1110 may assign the references to the respective portions of the second precompiled header. Each reference may be different from others of the references. Storage logic 1108 may store the portions in respective locations in memory of device 1100 (e.g., in respective locations in store 1104 and/or shared precompiled header cache 1116). Storage logic 1108 may store the references with the portions in store 1104 and/or shared precompiled header cache 1116. Storage logic 1108 and/or determination logic 1110 may maintain a lookup table that cross-references the references and addresses of the respective memory locations.

At step 1018, each portion of the second precompiled header is selectively loaded independently from other portions of the second precompiled header based on whether the respective portion is referenced in the computer program. Upon completion of step 1018, the method of flowchart 1000 ends. In an example implementation, loader 1110 selectively loads each portion of the second precompiled header independently from the other portions of the second precompiled header based on whether the respective portion is referenced in the computer program.

It will be recognized that device 1100 may not include one or more of store 1104, compiler 1106, extractor 1108, loader 1110, storage logic 1112, determination logic 1114, and/or shared precompiled header cache 1116. Furthermore, device 1100 may include components in addition to or in lieu of store 1104, compiler 1106, extractor 1108, loader 1110, storage logic 1112, determination logic 1114, and/or shared precompiled header cache 1116.

Any one or more of user systems 102A-102M, any one or more of servers 106A-106N, selective loading build logic 108, selective loading build logic 1102, compiler 1106, extractor 1108, loader 1110, storage logic 1112, determination logic 1114, flowchart 200, flowchart 300, flowchart 400, flowchart 500, flowchart 600, flowchart 700, flowchart 800, flowchart 900, and/or flowchart 1000 may be implemented in hardware, software, firmware, or any combination thereof.

For example, any one or more of user systems 102A-102M, any one or more of servers 106A-106N, selective loading build logic 108, selective loading build logic 1102, compiler 1106, extractor 1108, loader 1110, storage logic 1112, determination logic 1114, flowchart 200, flowchart 300, flowchart 400, flowchart 500, flowchart 600, flowchart 700, flowchart 800, flowchart 900, and/or flowchart 1000 may be implemented, at least in part, as computer program code configured to be executed in one or more processors.

In another example, any one or more of user systems 102A-102M, any one or more of servers 106A-106N, selective loading build logic 108, selective loading build logic 1102, compiler 1106, extractor 1108, loader 1110, storage logic 1112, determination logic 1114, flowchart 200, flowchart 300, flowchart 400, flowchart 500, flowchart 600, flowchart 700, flowchart 800, flowchart 900, and/or flowchart 1000 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 12:
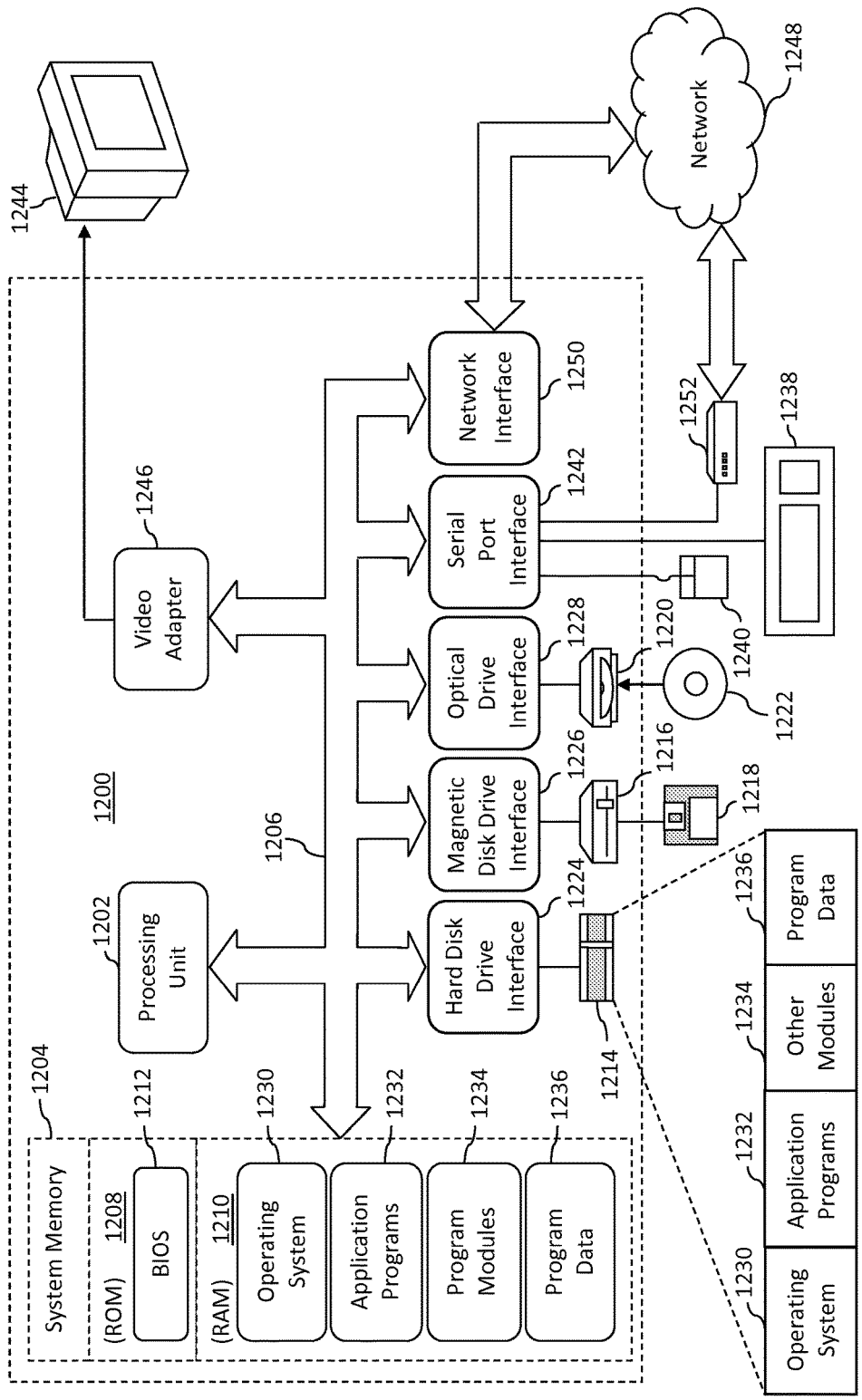
FIG. 12 depicts an example computer in which embodiments may be implemented.

FIG. 12 depicts an example computer 1200 in which embodiments may be implemented. Any one or more of user systems 102A-102M and/or any one or more of file servers 106A-106N shown in FIG. 1 and/or device 1100 shown in FIG. 11 may be implemented using computer 1200, including one or more features of computer 1200 and/or alternative features. Computer 1200 may be a general-purpose computing device in the form of a conventional personal computer, a mobile computer, or a workstation, for example, or computer 1200 may be a special purpose computing device. The description of computer 1200 provided herein is provided for purposes of illustration, and is not intended to be limiting. Embodiments may be implemented in further types of computer systems, as would be known to persons skilled in the relevant art(s).

As shown in FIG. 12, computer 1200 includes a processing unit 1202, a system memory 1204, and a bus 1206 that couples various system components including system memory 1204 to processing unit 1202. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computer 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1230, one or more application programs 1232, other program modules 1234, and program data 1236. Application programs 1232 or program modules 1234 may include, for example, computer program logic for implementing any one or more of selective loading build logic 108, selective loading build logic 1102, compiler 1106, extractor 1108, loader 1110, storage logic 1112, determination logic 1114, flowchart 200 (including any step of flowchart 200), flowchart 300 (including any step of flowchart 300), flowchart 400 (including any step of flowchart 400), flowchart 500 (including any step of flowchart 500), flowchart 600 (including any step of flowchart 600), flowchart 700 (including any step of flowchart 700), flowchart 800 (including any step of flowchart 800), flowchart 900 (including any step of flowchart 900), and/or flowchart 1000 (including any step of flowchart 1000), as described herein.

A user may enter commands and information into the computer 1200 through input devices such as keyboard 1238 and pointing device 1240. Other input devices (not shown) may include a microphone, joystick, game pad, satellite dish, scanner, touch screen, camera, accelerometer, gyroscope, or the like. These and other input devices are often connected to the processing unit 1202 through a serial port interface 1242 that is coupled to bus 1206, but may be connected by other interfaces, such as a parallel port, game port, or a universal serial bus (USB).

A display device 1244 (e.g., a monitor) is also connected to bus 1206 via an interface, such as a video adapter 1246. In addition to display device 1244, computer 1200 may include other peripheral output devices (not shown) such as speakers and printers.

Computer 1200 is connected to a network 1248 (e.g., the Internet) through a network interface or adapter 1250, a modem 1252, or other means for establishing communications over the network. Modem 1252, which may be internal or external, is connected to bus 1206 via serial port interface 1242.

As used herein, the terms "computer program medium" and "computer-readable storage medium" are used to generally refer to media such as the hard disk associated with hard disk drive 1214, removable magnetic disk 1218, removable optical disk 1222, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250 or serial port interface 1242. Such computer programs, when executed or loaded by an application, enable computer 1200 to implement features of embodiments discussed herein. Accordingly, such computer programs represent controllers of the computer 1200.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:
1. A method comprising:
   compiling, using one or more processors, a header file in a designated context of a computer program to provide a precompiled header in one or more data structures, the designated context including a designated location of the header file with respect to other portions of the computer program and a designated order of the header file with respect to the other portions of the computer program;
   extracting the precompiled header from the one or more data structures based on the context;

identifying an include directive that is associated with the header file;
loading a reference that is associated with the precompiled header during compilation of the computer program; and
deferring loading of a portion of the precompiled header, in response to loading the reference, until content of the portion is referenced in the computer program.

2. The method of claim 1, wherein loading the reference comprises:
loading a name of the header file; and
wherein deferring the loading of the portion of the precompiled header comprises:
deferring the loading of the portion of the precompiled header until the name of the header file is referenced in the computer program.

3. The method of claim 1, wherein loading the reference comprises:
loading a plurality of references that are associated with the precompiled header, the plurality of references corresponding to a plurality of respective portions of the precompiled header; and
wherein deferring the loading of the portion of the precompiled header comprises:
deferring loading of each of the plurality of portions until content of the respective portion is referenced in the computer program.

4. The method of claim 1, further comprising:
storing a context indicator that specifies the designated location and the designated order based on the header file being compiled in the designated context; and
reviewing the context indicator to determine the designated location and the designated order;
wherein extracting the precompiled header comprises:
extracting the precompiled header in response to reviewing the context indicator.

5. The method of claim 1, further comprising:
allocating a plurality of memory address ranges to a plurality of respective header files of the computer program;
wherein compiling the header file comprises:
compiling the plurality of header files to provide a plurality of respective precompiled headers, each precompiled header of the plurality of precompiled headers being provided in one or more data structures in a respective memory address range of the plurality of memory address ranges; and
wherein each precompiled header is unmodifiable by others of the plurality of precompiled headers.

6. The method of claim 1, further comprising:
identifying one or more symbols that are defined in the header file, the one or more symbols including one or more pointers; and
determining one or more dependencies of the one or more symbols based on the one or more pointers pointing to the one or more dependencies;
wherein extracting the precompiled header comprises:
extracting the one or more symbols and the one or more dependencies.

7. The method of claim 1, further comprising:
in response to identifying the include directive, determining whether the designated context and a reference context are same;
wherein loading the reference comprises:
loading the reference in response to a determination that the designated context and the reference context are the same.

8. The method of claim 1, further comprising:
in response to identifying the include directive, determining whether a meaning of the header file in the designated context and a meaning of the header file in a reference context, which is different from the designated context, are same;
wherein loading the reference comprises:
loading the reference in response to a determination that the meaning of the header file in the designated context and the meaning of the header file in the reference context are the same.

9. The method of claim 8, wherein a plurality of references are associated with a plurality of respective versions of the precompiled header that are associated with a plurality of respective contexts; and
wherein loading the reference comprises:
selecting the reference from the plurality of references based on the reference being associated with a designated version of the precompiled header that is associated with the designated context.

10. A system comprising:
one or more processors;
a compiler, implemented using at least one of the one or more processors, configured to compile a plurality of header files to provide a plurality of precompiled headers, each precompiled header being included in one or more respective data structures that represent source code of one or more header files of the plurality of header files from which the precompiled header is compiled;
an extractor configured to extract each precompiled header of the plurality of precompiled headers from the respective one or more data structures, the extractor further configured to distinguish each precompiled header of the plurality of precompiled headers from others of the plurality of precompiled headers;
at least one of the compiler or determination logic configured to identify an include directive that is associated with at least one header file; and
a loader configured to selectively load each precompiled header independently from others of the plurality of precompiled headers based on whether the respective precompiled header is referenced in a computer program.

11. The system of claim 10, wherein the extractor is further configured to distinguish each portion of a plurality of portions of at least one precompiled header of the plurality of precompiled headers from others of the plurality of portions; and
wherein the loader is configured to selectively load each portion of the plurality of portions independently from others of the plurality of portions based on whether the respective portion is referenced in the computer program.

12. The system of claim 10, wherein each precompiled header is included in a respective subset of a plurality of data structures, each subset including the one or more respective data structures in which the respective precompiled header is included; and
wherein the extractor is configured to organize each subset of the plurality of subsets in memory to not overlap with others of the plurality of subsets in the memory.

13. The system of claim 10, comprising:
the determination logic configured to determine that at least one header file of the plurality of header files includes at least one pointer, the determination logic further configured to determine at least one dependency of the at least one header file based on the at least one pointer pointing to the at least one dependency;

wherein the extractor is configured to extract each precompiled header and the at least one dependency.

14. The system of claim 10, comprising:

the determination logic configured to, in response to identification of the include directive, determine whether a specified context in which the at least one header file is compiled to provide at least one corresponding precompiled header of the plurality of precompiled headers and a reference context are same;

wherein the loader is configured to load the at least one corresponding precompiled header, in response to a determination that the specified context and the reference context are the same, based on the at least one corresponding precompiled header being referenced in the computer program.

15. The system of claim 10, wherein the at least one header file includes a designated header file;

wherein the system comprises:

the determination logic configured to, in response to identification of the include directive, determine whether a meaning of the designated header file in a specified context in which the designated header file is compiled to provide a corresponding precompiled header of the plurality of precompiled headers and a meaning of the designated header file in a reference context, which is different from the specified context, are same; and wherein the loader is configured to load the corresponding precompiled header, in response to a determination that the meaning of the designated header file in the specified context and the meaning of the designated header file in the reference context are the same, based on the corresponding precompiled header being referenced in the computer program.

16. The system of claim 15, wherein a plurality of versions of the corresponding precompiled header are associated with a plurality of respective contexts; and wherein the loader is configured to load a designated version of the corresponding precompiled header based on the designated version being associated with the specified context.

17. A computer program product comprising a computer-readable storage medium having computer program logic recorded thereon for enabling a processor-based system to selectively load portions of a precompiled header, the computer program logic comprising:

a first program logic module for enabling the processor-based system to compile a header file to provide the precompiled header in one or more data structures;

a second program logic module for enabling the processor-based system to extract the precompiled header from the one or more data structures;

a third program logic module for enabling the processor-based system to identify an include directive that is associated with the header file;

a fourth program logic module for enabling the processor-based system to distinguish each portion of a plurality of portions of the precompiled header from others of the plurality of portions based on a plurality of references that correspond to the plurality of respective portions; and a fifth program logic module for enabling the processor-based system to selectively load each portion of the plurality of portions independently from others of the plurality of portions based on whether the respective portion is referenced in a computer program.

18. The computer program product of claim 17, further comprising:

a sixth program logic module for enabling the processor-based system to, in response to identification of the include directive, determine whether the designated context and a reference context are same;

wherein the fifth program logic module comprises:

logic for enabling the processor-based system to load each of one or more portions of the plurality of portions independently from others of the plurality of portions, in response to a determination that the designated context and the reference context are the same, based on the respective portion of the one or more portions being referenced in the computer program.

19. The computer program product of claim 17, further comprising:

a sixth program logic module for enabling the processor-based system to, in response to identification of the include directive, determine whether a meaning of the header file in the designated context and a meaning of the header file in a reference context, which is different from the designated context, are same;

wherein the fifth program logic module comprises:

logic for enabling the processor-based system to load each of one or more portions of the plurality of portions independently from others of the plurality of portions, in response to a determination that the meaning of the header file in the designated context and the meaning of the header file in the reference context are the same, based on the respective portion of the one or more portions being referenced in the computer program.

20. The computer program product of claim 19, wherein a plurality of versions of the precompiled header are associated with a plurality of respective contexts; and wherein the fifth program logic module comprises:

logic for enabling the processor-based system to load each of the one or more portions of the plurality of portions of a designated version of the precompiled header independently from others of the plurality of portions, in response to the determination that the meaning of the header file in the designated context and the meaning of the header file in the reference context are the same, based on the respective portion of the one or more portions being referenced in the computer program and further based on the designated version being associated with the designated context.

* * * * *